(12) United States Patent
Sanchez

(10) Patent No.: US 12,143,904 B2
(45) Date of Patent: *Nov. 12, 2024

(54) SYSTEMS AND METHODS FOR VERIFYING RELIABILITY OF SENSOR DATA RECEIVED FROM MOBILE DEVICES

(71) Applicant: BlueOwl, LLC, San Francisco, CA (US)

(72) Inventor: Kenneth Jason Sanchez, San Francisco, CA (US)

(73) Assignee: QUANATA, LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/207,889

(22) Filed: Jun. 9, 2023

(65) Prior Publication Data

US 2023/0328488 A1    Oct. 12, 2023

Related U.S. Application Data

(63) Continuation of application No. 17/830,440, filed on Jun. 2, 2022, now Pat. No. 11,729,589, which is a continuation of application No. 16/922,944, filed on Jul. 7, 2020, now Pat. No. 11,363,426.

(51) Int. Cl.
*H04W 4/38*       (2018.01)
*G01S 13/87*      (2006.01)
*G05B 23/02*      (2006.01)
*G06Q 40/08*      (2012.01)

(52) U.S. Cl.
CPC .............. *H04W 4/38* (2018.02); *G01S 13/876* (2013.01); *G05B 23/0227* (2013.01); *G06Q 40/08* (2013.01)

(58) Field of Classification Search
CPC .... H04W 4/38; G01S 13/876; G05B 23/0227; G06Q 40/08
USPC ...................................... 455/456.1
See application file for complete search history.

(56) References Cited

U.S. PATENT DOCUMENTS

2017/0021764 A1*  1/2017  Adams ................. G06Q 40/08
2020/0267253 A1*  8/2020  Grunfeld ............... H04W 12/06

* cited by examiner

*Primary Examiner* — Tanmay K Shah
(74) *Attorney, Agent, or Firm* — BRYAN CAVE LEIGHTON PAISNER LLP

(57) ABSTRACT

Method and system for verifying a reliability of sensor data received from a mobile device of a user are disclosed. For example, the method includes receiving first sensor data collected and/or generated by one or more sensors of the mobile device from an application installed on a mobile device of a user at a first time, receiving second sensor data collected and/or generated by the one or more sensors of the mobile device from the application at a second time, determining whether the mobile device is in a vehicle that the user is driving during a time interval based at least upon the first sensor data and the second sensor data, and in response to the mobile device not being in the vehicle that the user is driving during the time interval, transmitting a notification to the mobile device indicating that the application does not work properly.

23 Claims, 8 Drawing Sheets

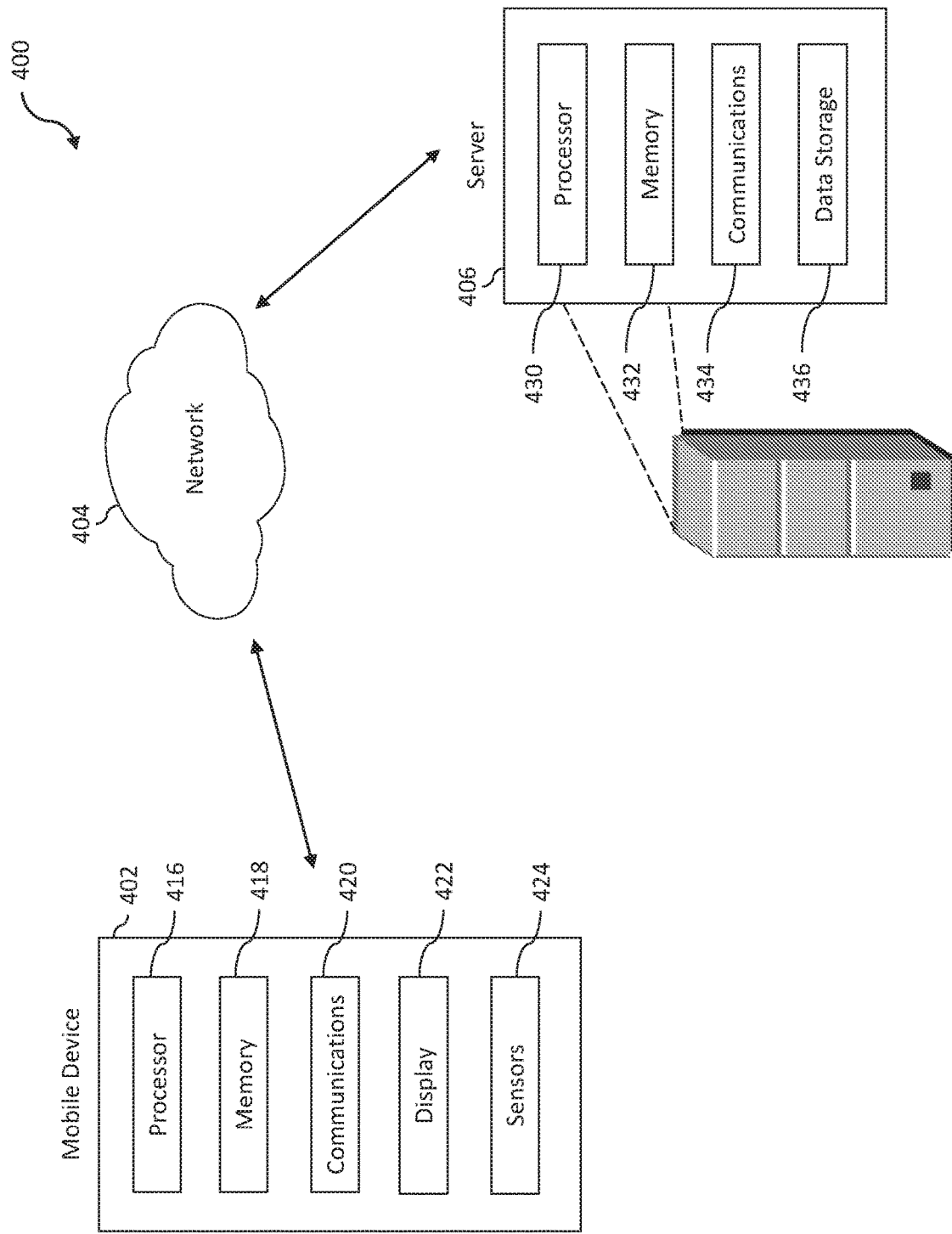

SYSTEMS AND METHODS FOR VERIFYING RELIABILITY OF SENSOR DATA RECEIVED FROM MOBILE DEVICES

This application is a continuation of U.S. patent application Ser. No. 17/830,440, filed Jun. 2, 2022, which is a continuation of U.S. patent application Ser. No. 16/922,944, filed Jul. 7, 2020, the disclosures of which being expressly incorporated by reference herein for all purposes.

FIELD OF THE DISCLOSURE

Some embodiments of the present disclosure are directed to verifying a reliability of sensor data received from a mobile device. More particularly, certain embodiments of the present disclosure provide methods and systems for verifying a reliability of sensor data received from a mobile device of a user based at least in part upon a receipt of sensor data from an application that is configured to transmit sensor data in response to the mobile device being in a vehicle that the user is driving. Merely by way of example, the present disclosure has been applied to determining that the mobile device is working properly and that the sensor data is reliable. But it would be recognized that the present disclosure has much broader range of applicability.

BACKGROUND OF THE DISCLOSURE

An application installed on mobile devices of users may provide data generated by one or more sensors of the mobile devices that is related to user behaviors, such as driving behaviors. Such data may be used to generate alert notifications to the users that may reduce the likelihood of a collision or other damage occurring to the vehicles or the users. In other words, the use of the application may function to mitigate or prevent driving risks. Hence it is highly desirable to develop more accurate techniques for determining that the mobile device is working properly to provide reliable sensor data.

BRIEF SUMMARY OF THE DISCLOSURE

Some embodiments of the present disclosure are directed to verifying a reliability of sensor data received from a mobile device. More particularly, certain embodiments of the present disclosure provide methods and systems for verifying a reliability of sensor data received from a mobile device of a user based at least in part upon a receipt of sensor data from an application that is configured to transmit sensor data in response to the mobile device being in a vehicle that the user is driving. Merely by way of example, the present disclosure has been applied to determining that the mobile device is working properly and that the sensor data is reliable. But it would be recognized that the present disclosure has much broader range of applicability.

According to some embodiments, a method for verifying a reliability of sensor data received from a mobile device of a user is disclosed. The method includes receiving first sensor data collected and/or generated by one or more sensors of the mobile device at a first time from an application installed on a mobile device of a user. The first sensor data includes one or more types of sensor data. At a time of being installed onto the mobile device, the application is configured to send the one or more types of sensor data in response to the mobile device being in the vehicle that the user is driving. The method further includes receiving second sensor data collected and/or generated by the one or more sensors of the mobile device at a second time from the application. The second sensor data includes the one or more types of sensor data, and the second time follows the first time by a time interval. Additionally, the method includes determining whether the mobile device is in a vehicle that the user is driving during the time interval based at least upon the first sensor data and the second sensor data. Moreover, the method includes transmitting a notification to the mobile device indicating that the application does not work properly in response to the mobile device not being in the vehicle that the user is driving during the time interval.

According to certain embodiments, a computing device for verifying a reliability of sensor data received from a mobile device of a user is disclosed. The computing device includes one or more processors and a memory that stores instructions for execution by the one or more processors. The instructions, when executed, cause the one or more processors to receive first sensor data collected and/or generated by one or more sensors of the mobile device at a first time from an application installed on a mobile device of a user. The first sensor data includes one or more types of sensor data. At a time of being installed onto the mobile device, the application is configured to send the one or more types of sensor data in response to the mobile device being in the vehicle that the user is driving. Also, the instructions, when executed, cause the one or more processors to receive second sensor data collected and/or generated by the one or more sensors of the mobile device at a second time from the application. The second sensor data includes the one or more types of sensor data, and the second time follows the first time by a time interval. Additionally, the instructions, when executed, cause the one or more processors to determine whether the mobile device is in a vehicle that the user is driving during the time interval based at least upon the first sensor data and the second sensor data. Moreover, the instructions, when executed, cause the one or more processors to transmit a notification to the mobile device indicating that the application does not work properly in response to the mobile device not being in the vehicle that the user is driving during the time interval.

According to some embodiments, a non-transitory computer-readable medium stores instructions for verifying a reliability of sensor data received from a mobile device of a user. The instructions are executed by one or more processors of a computing device. The non-transitory computer-readable medium includes instructions to receive first sensor data collected and/or generated by one or more sensors of the mobile device at a first time from an application installed on a mobile device of a user. The first sensor data includes one or more types of sensor data. At a time of being installed onto the mobile device, the application is configured to send the one or more types of sensor data in response to the mobile device being in the vehicle that the user is driving. Also, the non-transitory computer-readable medium includes instructions to receive second sensor data collected and/or generated by the one or more sensors of the mobile device at a second time from the application. The second sensor data includes the one or more types of sensor data, and the second time follows the first time by a time interval. Additionally, the non-transitory computer-readable medium includes instructions to determine whether the mobile device is in a vehicle that the user is driving during the time interval based at least upon the first sensor data and the second sensor data. Moreover, the non-transitory computer-readable medium includes instructions to transmit a notification to the mobile device indicating that the application does not work properly in response to the mobile device not being in the vehicle that the user is driving during the time interval.

Depending upon the embodiment, one or more benefits may be achieved. These benefits and various additional objects, features and advantages of the present disclosure can be fully appreciated with reference to the detailed description and accompanying drawings that follow.

BRIEF DESCRIPTION OF THE DRAWINGS

FIG. 4 is a simplified diagram showing a system for verifying a reliability of sensor data received from a mobile device of a user according to certain embodiments of the present disclosure.

DETAILED DESCRIPTION OF THE DISCLOSURE

Some embodiments of the present disclosure are directed to verifying a reliability of sensor data received from a mobile device. More particularly, certain embodiments of the present disclosure provide methods and systems for verifying a reliability of sensor data received from a mobile device of a user based at least in part upon a receipt of sensor data from an application that is configured to transmit sensor data in response to the mobile device being in a vehicle that the user is driving. Merely by way of example, the present disclosure has been applied to determining that the mobile device is working properly and that the sensor data is reliable. But it would be recognized that the present disclosure has much broader range of applicability.

Figure 1:
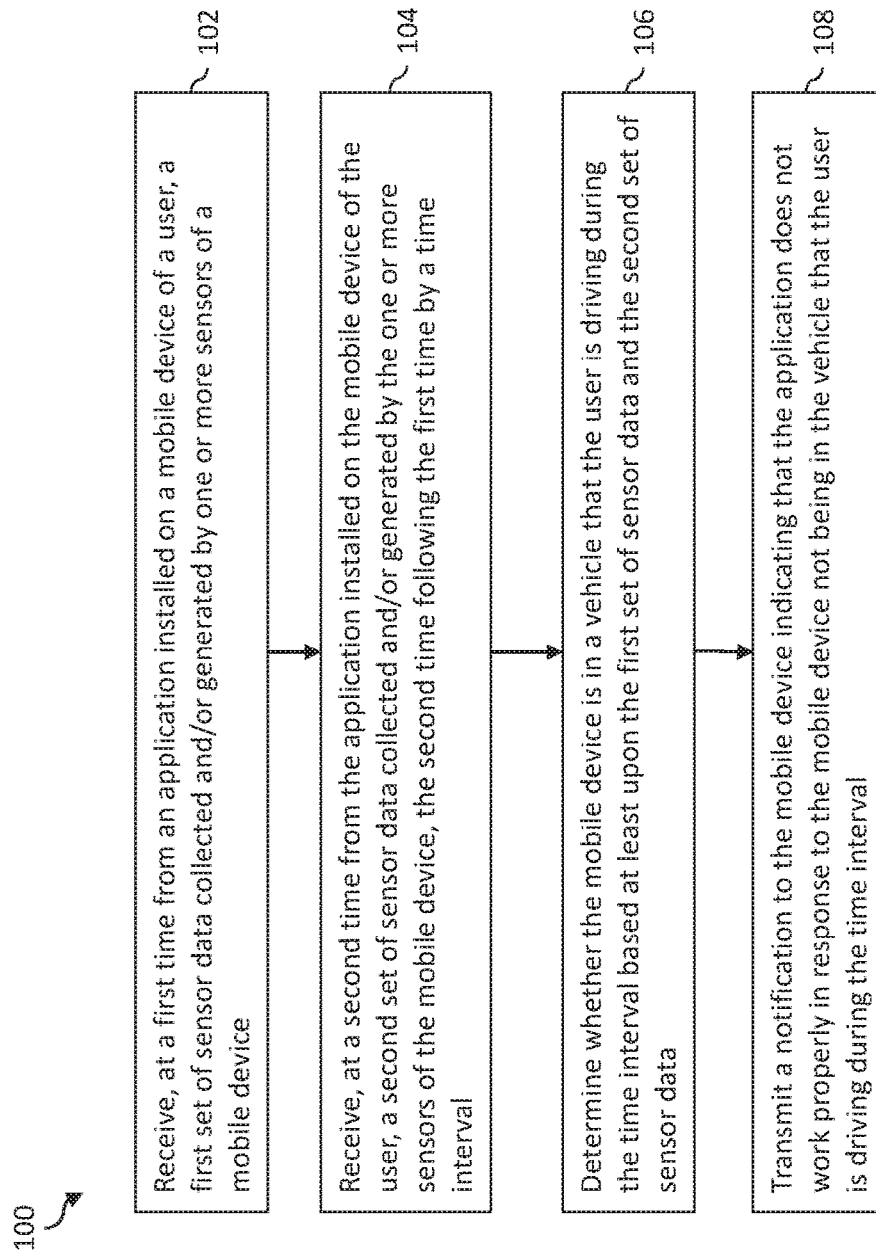
FIG. 1 is a simplified diagram showing a method for verifying a reliability of sensor data received from a mobile device of a user according to certain embodiments of the present disclosure.

I. One or More Methods for Determining a Status of a Mobile Device According to Certain Embodiments FIG. 1 is a simplified diagram showing a method 100 for verifying a reliability of sensor data received from a mobile device of a user according to certain embodiments of the present disclosure. This diagram is merely an example, which should not unduly limit the scope of the claims. One of ordinary skill in the art would recognize many variations, alternatives, and modifications. In the illustrative embodiment, the method 100 is performed by a computing device (e.g., a server 406 that is communicatively coupled to the mobile device). However, it should be appreciated that, in some embodiments, some of the method 100 is performed by the mobile device.

The method 100 includes process 102 for receiving a first set of sensor data at a first time from an application installed on a mobile device of a user, process 104 for receiving a second set of sensor data at a second time from the application, process 106 for determining whether the mobile device is in a vehicle that the user is driving during a time interval between the first time and the second time based at least upon the first set of sensor data and the second set of sensor data, and process 108 for transmitting a notification to the mobile device indicating that the application does not work properly in response to the mobile device not being in the vehicle that the user is driving during the time interval.

Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced. For example, although the method 100 is described as performed by the computing device above, some or all processes of the method are performed by any computing device or a processor directed by instructions stored in memory. As an example, some or all processes of the method are performed according to instructions stored in a non-transitory computer-readable medium.

Specifically, at the process 102, the first set of sensor data includes one or more types of sensor data that was collected and/or generated by one or more sensors of the mobile device according to some embodiments. For example, the one or more types of sensor data include a first type for accelerometer data, a second type for gyroscope data, a third type for location data, and a fourth type for magnetometer data. The application that is installed on the mobile device is configured to transmit a first set of sensor data. For example, the application broadcasts the first set of sensor data to be received by nearby devices and/or directly transmits the first set of sensor data to a destination computing device (e.g., a server that is communicatively coupled to the mobile device). In response, the computing device receives the first set of sensor data at the first time.

In the illustrative embodiment, at the time when the application was installed on the mobile device of the user, the application is configured to transmit one or more types of sensor data in response to a determination that the mobile device is in the vehicle that the user is driving. In such embodiment, the first set of sensor data includes information related to a user activity (e.g., driving behavior). As an example, the user driving behavior represents a manner in which the user has operated a vehicle. For example, the user driving behavior indicates the user's driving habits and/or driving patterns.

According to some embodiments, the first set of sensor data indicative of the user driving behavior is collected from one or more sensors associated with the user's mobile device. For example, the one or more sensors include any type and number of accelerometers, gyroscopes, magnetometers, location sensors (e.g., GPS sensors), and/or any other suitable sensors that measure the state and/or movement of the mobile device. In certain embodiments, the first set of sensor data is collected continuously or at predetermined time intervals. According to certain embodiments, the first set of sensor data is collected based on a triggering event. For example, the first set of sensor data is collected when each sensor has acquired a threshold amount of sensor measurements. In other words, the sensor measurements may indicate that the mobile device is in a moving vehicle.

According to certain embodiments, the application is configured to transmit the first set of sensor data periodically every first predetermined time interval when the application is triggered by a predetermined event. In other words, the application may work properly in the background but may not transmit any sensor data until the predetermined event occurs. As an example, this reduces a battery power consumption and preserves battery life. For example, as discussed above, the predetermined event is a driving event. According to certain embodiments, the application determines the driving event based on the sensor data collected or generated by the mobile device. Additionally or alternatively, the application receives an input from the user that indicates that the user is driving according to certain embodiments. However, it should be appreciated that, in some embodiments, the application periodically transmits sensor data every predetermined time interval.

At the process 104, the application that is installed on the mobile device is configured to transmit the second set of sensor data that was collected and/or generated by one or more sensors of the mobile device according to some embodiments. For example, the application broadcasts the second set of sensor data to be received by nearby devices and/or directly transmits the second set of sensor data to a destination computing device (e.g., a server that is communicatively coupled to the mobile device). In response, the computing device receives the second set of sensor data at the second time. In the illustrative embodiment, the second set of sensor data is a set of sensor data that is received from the mobile device by the computing device subsequent to receiving the first set of sensor data. In other words, the second time follows the first time by a time interval. It should be appreciated that, in certain embodiments, the second set of sensor data includes sensor data that has been collected or generated from the same sensors of the mobile device that generated the first set of sensor data.

According to certain embodiments, the second set of sensor data includes information related to a user activity (e.g., driving behavior). As an example, the user driving behavior represents a manner in which the user has operated a vehicle. For example, the user driving behavior indicates the user's driving habits and/or driving patterns.

According to some embodiments, the second set of sensor data indicative of the user driving behavior is collected from one or more sensors associated with the user's mobile device. For example, the one or more sensors include any type and number of accelerometers, gyroscopes, magnetometers, location sensors (e.g., GPS sensors), and/or any other suitable sensors that measure the state and/or movement of the mobile device. According to certain embodiments, the second set of sensor data is collected based on a triggering event. As discussed above, in the illustrative embodiment, the application is configured to transmit a set of sensor data when the application is triggered by driving event (i.e., the predetermined event). According to certain embodiments, the application determines the driving event based at least upon sensor data collected and/or generated by one or more sensors of the mobile device and/or user input. In other words, the application may work properly in the background and may not transmit any sensor data until the predetermined event occurs. As an example, this reduces a battery power consumption and preserves battery life.

At the process 106, the computing device determines whether the mobile device is in a vehicle that the user is driving during a time interval between the first time and the second time based at least upon the first set of sensor data and the second set of sensor data received from the mobile device. As discussed above, when the application is initially installed on the mobile device, the application is configured to only transmit the sensor data that was collected and/or generated by the one or more sensors of the mobile device while the mobile device is in a vehicle that the user is driving. In other words, theoretically, the sensor data that was received from the application should represent sensor data that was collected and/or generated by the mobile device while the mobile device was in a vehicle. However, in real life, the sensor data received from the application may not be reliable for various reasons. To verify that the application is working properly and that the set of sensor data received from the application is reliable, the computing device determines whether the first set of sensor data and the second set of sensor data were generated and/or collected while the mobile device was indeed in a vehicle.

At the process 108, in response to the determination that the mobile device is not in the vehicle that the user is driving during the time interval, the notification is transmitted to the mobile device indicating that the application does not work properly. In other words, according to some embodiments, the set of sensor data does not adequately represent the driving behavior of the user. As an example, the user driving behavior represents a manner in which the user has operated a vehicle. For example, the user driving behavior indicates the user's driving habits and/or driving patterns.

Figure 2A:
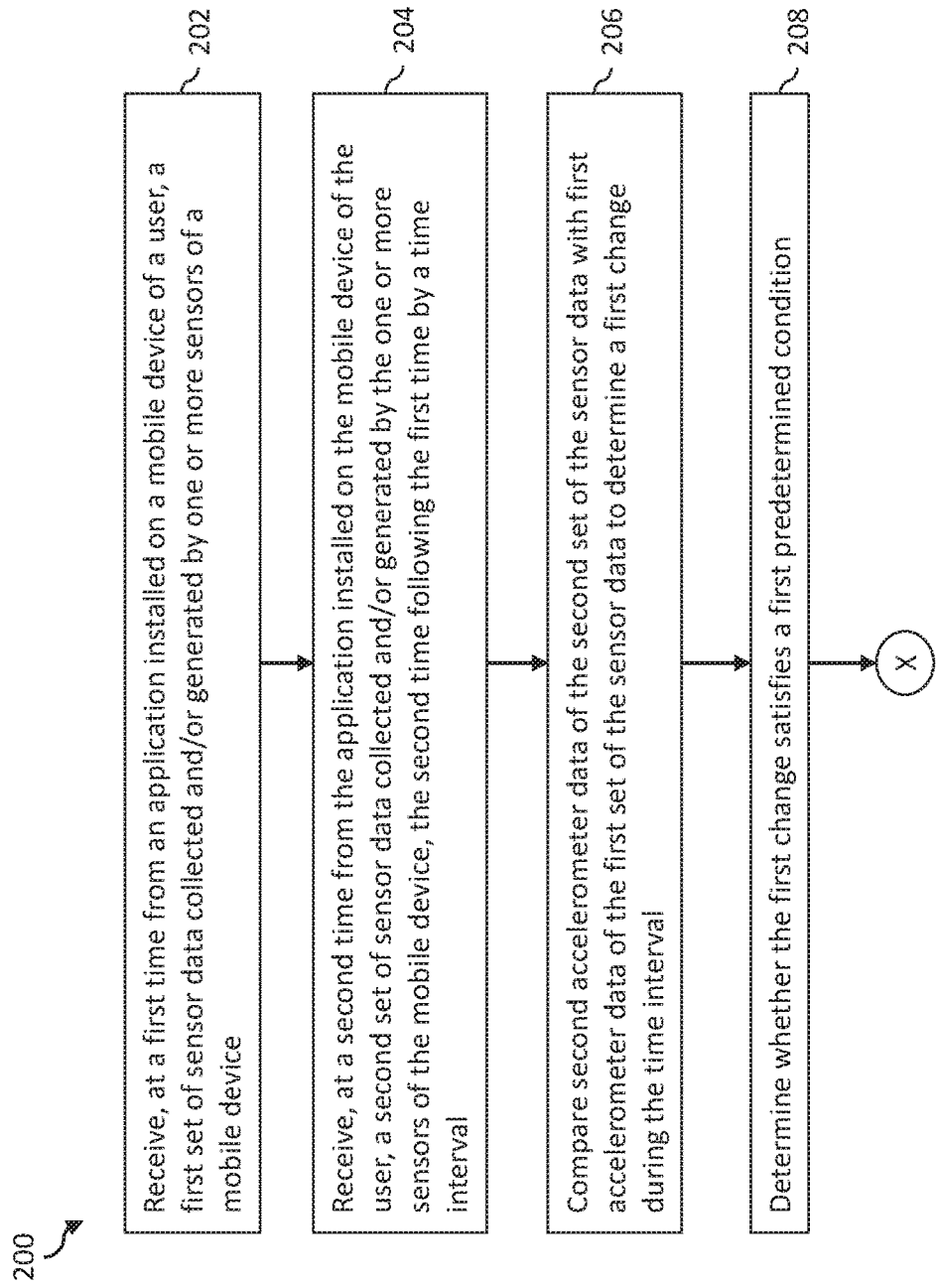
FIGS. 2A, 2B and 2C are simplified diagrams showing a method for verifying a reliability of sensor data received from a mobile device of a user according to some embodiments of the present disclosure.
Figure 2B:
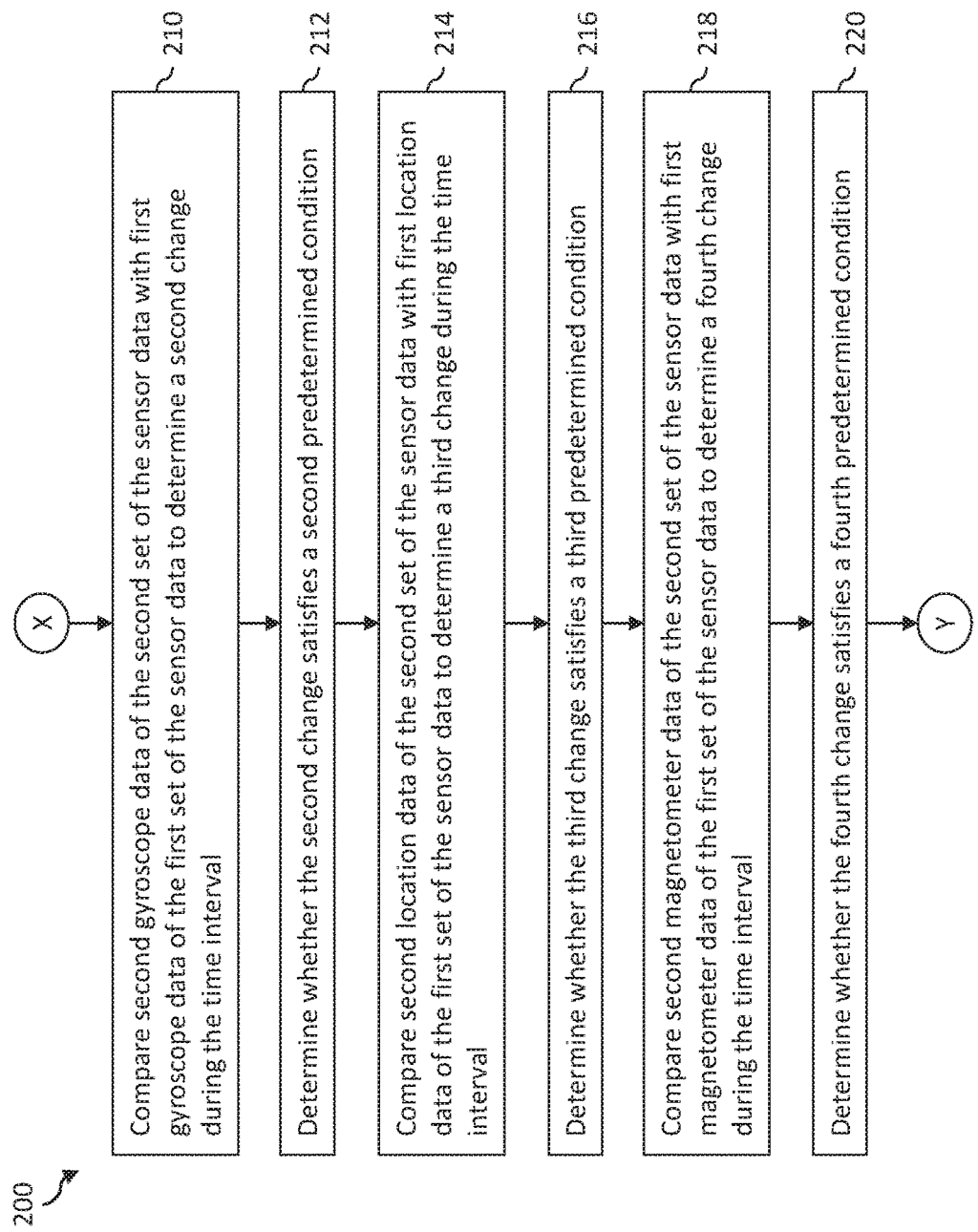
Figure 2C:
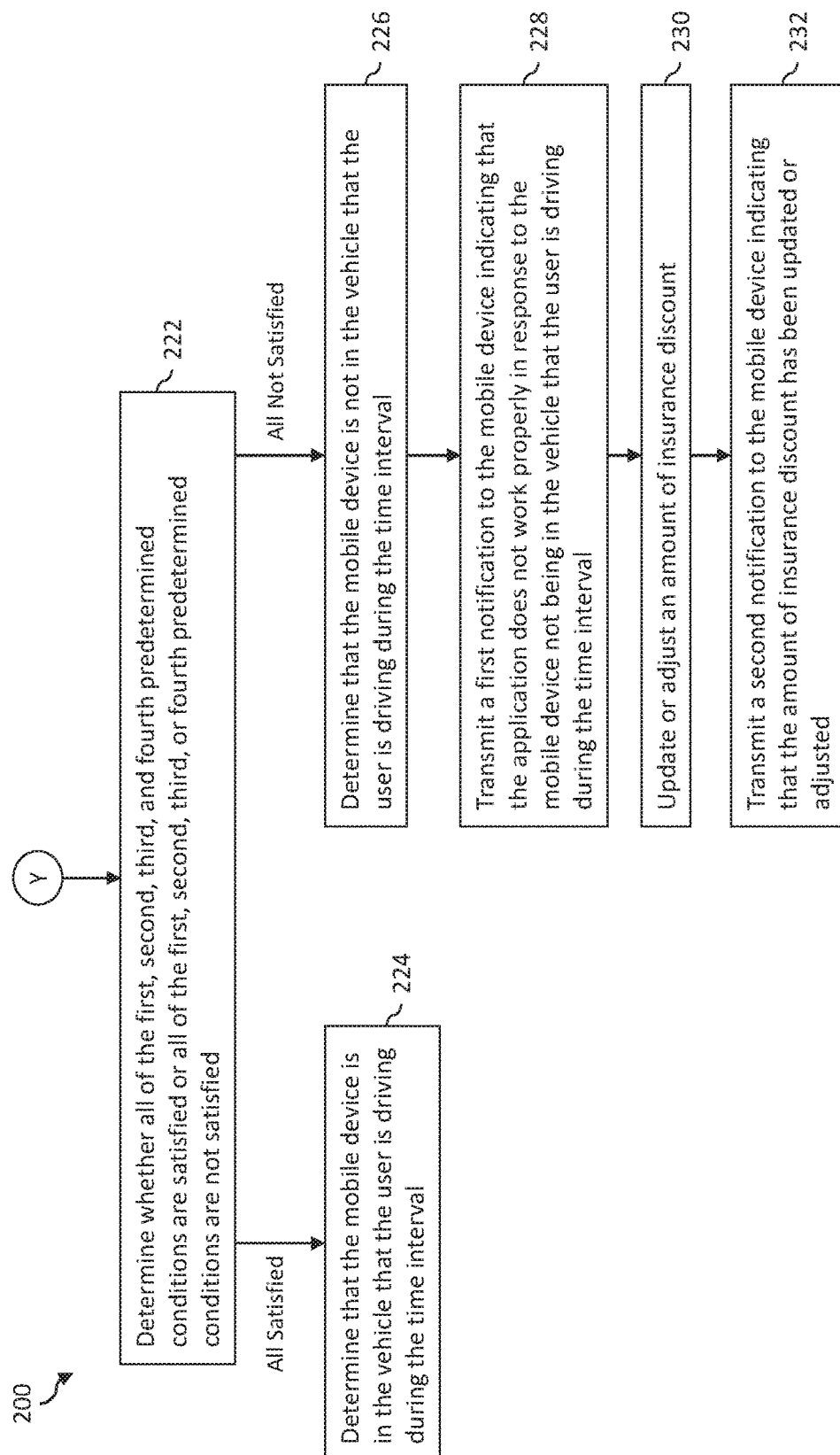

FIGS. 2A, 2B and 2C are simplified diagrams showing a method 200 for verifying a reliability of sensor data received from a mobile device of a user according to certain embodiments of the present disclosure. This diagram is merely an example, which should not unduly limit the scope of the claims. One of ordinary skill in the art would recognize many variations, alternatives, and modifications. In the illustrative embodiment, the method 200 is performed by a computing device (e.g., a server 406 that is communicatively coupled to the mobile device). However, it should be appreciated that, in some embodiments, some of the method 200 is performed by the mobile device.

The method 200 includes process 202 for receiving a first set of sensor data at a first time from an application installed on a mobile device of a user, process 204 for receiving a second set of sensor data at a second time from the application, process 206 for comparing second accelerometer data of the second set of the sensor data with first accelerometer data of the first set of the sensor data to determine a first change during a time interval between the first time and the second time, process 208 for determining whether the first change satisfies a first predetermined condition, process 210 for comparing second gyroscope data of the second set of the sensor data with first gyroscope data of the first set of the sensor data to determine a second change during the time interval, process 212 for determining whether the second change satisfies a second predetermined condition, process 214 for comparing second location data of the second set of the sensor data with first location data of the first set of the sensor data to determine a third change during the time interval, process 216 for determining whether the third change satisfies a third predetermined condition, process 218 for comparing second magnetometer data of the second set of the sensor data with first magnetometer data of the first set of the sensor data to determine a fourth change during the time interval, process 220 for determining whether the fourth change satisfies a fourth predetermined condition, process 222 for determining whether all of the first, second, third, fourth predetermined conditions are satisfied or all of the first, second, third, fourth predetermined conditions are not satisfied, process 224 for determining that the mobile device is in the vehicle that the user is driving during the time interval in response to determining that the all of the first, second, third, fourth predetermined conditions are satisfied, process 226 for determining that the mobile device is not in the vehicle that the user is driving during the time interval in response to determining that the all of the first, second, third, fourth predetermined conditions are not satisfied, process 228 for transmitting a first notification to the mobile device indicating that the application does not work properly in response to the mobile device not being in the vehicle that the user is driving during the time interval, process 230 for updating or adjusting an amount of insurance discount, and process 232 for transmitting a second notification to the mobile device indicating that the amount of insurance discount has been updated or adjusted.

Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced. For example, although the method 100 is described as performed by the computing device above, some or all processes of the method are performed by any computing device or a processor directed by instructions stored in memory. As an example, some or all processes of the method are performed according to instructions stored in a non-transitory computer-readable medium.

Specifically, at the process 202, the first set of sensor data includes one or more types of sensor data that was collected and/or generated by one or more sensors of the mobile device according to some embodiments. For example, the one or more types of sensor data include a first type for accelerometer data, a second type for gyroscope data, a third type for location data, and a fourth type for magnetometer data. The application that is installed on the mobile device is configured to transmit a first set of sensor data. For example, the application broadcasts the first set of sensor data to be received by nearby devices and/or directly transmits the first set of sensor data to a destination computing device (e.g., a server that is communicatively coupled to the mobile device). In response, the computing device receives the first set of sensor data at the first time.

In the illustrative embodiment, at the time when the application was installed on the mobile device of the user, the application is configured to transmit one or more types of sensor data in response to a determination that the mobile device is in the vehicle that the user is driving. In such embodiment, the first set of sensor data includes information related to a user activity (e.g., driving behavior). As an example, the user driving behavior represents a manner in which the user has operated a vehicle. For example, the user driving behavior indicates the user's driving habits and/or driving patterns.

According to some embodiments, the first set of sensor data indicative of the user driving behavior is collected from one or more sensors associated with the user's mobile device. For example, the one or more sensors include any type and number of accelerometers, gyroscopes, magnetometers, location sensors (e.g., GPS sensors), and/or any other suitable sensors that measure the state and/or movement of the mobile device. In certain embodiments, the first set of sensor data is collected continuously or at predetermined time intervals. According to certain embodiments, the first set of sensor data is collected based on a triggering event. For example, the first set of sensor data is collected when each sensor has acquired a threshold amount of sensor measurements. In other words, the sensor measurements may indicate that the mobile device is in a moving vehicle.

According to certain embodiments, the application is configured to transmit the first set of sensor data periodically every first predetermined time interval when the application is triggered by a predetermined event. In other words, the application may work properly in the background but may not transmit any sensor data until the predetermined event occurs. As an example, this reduces a battery power consumption and preserves battery life. For example, as discussed above, the predetermined event is a driving event. According to certain embodiments, the application determines the driving event based on the sensor data collected or generated by the mobile device. Additionally or alternatively, the application receives an input from the user that indicates that the user is driving according to certain embodiments. However, it should be appreciated that, in some embodiments, the application periodically transmits sensor data every predetermined time interval.

At the process 204, the application that is installed on the mobile device is configured to transmit the second set of sensor data that was collected and/or generated by one or more sensors of the mobile device according to some embodiments. For example, the application broadcasts the second set of sensor data to be received by nearby devices and/or directly transmits the second set of sensor data to a destination computing device (e.g., a server that is communicatively coupled to the mobile device). In response, the computing device receives the second set of sensor data at the second time. In the illustrative embodiment, the second set of sensor data is a set of sensor data that is received from the mobile device by the computing device subsequent to receiving the first set of sensor data. In other words, the second time follows the first time by a time interval. It should be appreciated that, in certain embodiments, the second set of sensor data includes sensor data that has been collected or generated from the same sensors of the mobile device that generated the first set of sensor data.

According to certain embodiments, the second set of sensor data includes information related to a user activity (e.g., driving behavior). As an example, the user driving behavior represents a manner in which the user has operated a vehicle. For example, the user driving behavior indicates the user's driving habits and/or driving patterns.

According to some embodiments, the second set of sensor data indicative of the user driving behavior is collected from one or more sensors associated with the user's mobile device. For example, the one or more sensors include any type and number of accelerometers, gyroscopes, magnetometers, location sensors (e.g., GPS sensors), and/or any other suitable sensors that measure the state and/or movement of the mobile device. According to certain embodiments, the second set of sensor data is collected based on a triggering event. As discussed above, in the illustrative embodiment, the application is configured to transmit a set of sensor data when the application is triggered by driving event (i.e., the predetermined event). According to certain embodiments, the application determines the driving event based at least upon sensor data collected and/or generated by one or more sensors of the mobile device and/or user input. In other words, the application may work properly in the background and may not transmit any sensor data until the predetermined event occurs. As an example, this reduces a battery power consumption and preserves battery life.

At the processes 206-220, the computing device determines whether the mobile device is in a vehicle that the user is driving during a time interval between the first time and the second time based at least upon the first set of sensor data and the second set of sensor data received from the mobile device. As discussed above, when the application is initially installed on the mobile device, the application is configured to only transmit the sensor data that was collected and/or generated by the one or more sensors of the mobile device while the mobile device is in a vehicle that the user is driving. In other words, theoretically, the sensor data that was received from the application should represent sensor data that was collected and/or generated by the mobile device while the mobile device was in a vehicle. However, in real life, the sensor data received from the application may not be reliable for various reasons. To verify that the application is working properly and that the set of sensor data received from the application is reliable, the computing device determines whether the first set of sensor data and the second set of sensor data were generated and/or collected while the mobile device was indeed in a vehicle.

In the illustrative embodiment, the first sensor data includes first accelerometer data corresponding to the first time, first gyroscope data corresponding to the first time, first location data corresponding to the first time, and first magnetometer data corresponding to the first time. The second sensor data includes second accelerometer data corresponding to the second time, second gyroscope data corresponding to the second time, second location data corresponding to the second time, and second magnetometer data corresponding to the second time.

Specifically, at the process 206, the first change in the accelerometer data during the time interval between the first time and the second time is determined by comparing the first accelerometer data and the second accelerometer data. For example, the first change indicates a change in movement of the mobile device during the time interval. According to some embodiments, the first accelerometer data is used to detect a first linear acceleration of movement of the mobile device corresponding to the first time, and the second accelerometer data is used to detect a second linear acceleration of movement of the mobile device corresponding to the second time. As such, according to certain embodiments, the first change indicates a change in the linear acceleration of movement of the mobile device.

At the process 208, the computing device determines whether the first change satisfies the first predetermined condition. For example, the first predetermined condition indicates one or more changes in the movements of the mobile device that are expected when the mobile device is in a vehicle while driving. According to some embodiments, the first predetermined condition is determined based on historical sensor data of other users. For example, the historical sensor data includes accelerometer data generated and/or collected by one or more mobile devices that have been verified to be positioned in a vehicle. Additionally or alternatively, the historical sensor data includes accelerometer data collected and/or generated by other mobile devices of other users who has similar demographic information as the user. For example, the demographic information may include, but not limited to, age, race, ethnicity, gender, marital status, income, education, and/or employment. In certain embodiments, the historical sensor data is defined and provided by an insurer associated with a vehicle of the user. It should be appreciated that, the historical sensor data is stored in the database (e.g., a data storage 436) of the computing device (e.g., a server 406), according to some embodiments.

According to some embodiments, the first predetermined condition is tailored to the user of the mobile device. For example, the first predetermined condition is based upon a life routine or pattern of the user (e.g., a driving pattern) at a particular time of a day, a particular time of a week, a particular time of a month, a particular time of a year, or any combination thereof. In some embodiments, these user data are obtained directly from the user or determined and/or predicted based on the previous sensor data of the user. For example, if the user typically drives 20 miles to and from work between traffic hours (e.g., 8 AM-9 AM and 5 PM-6 PM), 5 days (Mondays to Fridays) a week, the first predetermined condition is determined based upon the accelerometer data previously collected and/or generated during those time periods. It should be appreciated that, in some embodiments, the first predetermined condition is determined based upon the accelerometer data collected and/or generated by other mobile devices of other users who regularly travels or commutes the similar routes during those same time periods.

According to certain embodiments, the first predetermined condition is determined using one or more machine learning algorithms, programs, modules, or models based upon the historical accelerometer data and/or information received from the user. According to some embodiments, the first predetermined condition is defined and provided by the insurer associated with a vehicle of the user.

At the process 210, the second change in the gyroscope data during the time interval between the first time and the second time is determined by comparing the first gyroscope data and the second gyroscope data. For example, the second change indicates a change in rotational position and/or angular velocity of the mobile device during the time interval. According to some embodiments, the first gyroscope data is used to detect a first rotational position of the mobile device corresponding to the first time, and the second gyroscope data is used to detect a second rotational position of the mobile device corresponding to the second time. As such, according to certain embodiments, the second change indicates a change in the angular velocity of the mobile device.

At the process 212, the computing device determines whether the second change satisfies the second predetermined condition. For example, the second predetermined condition indicates one or more changes in the angular velocity of the mobile device that are expected when the mobile device is in a vehicle while driving. According to some embodiments, the second predetermined condition is determined based on historical sensor data of other users. For example, the historical sensor data includes gyroscope data generated and/or collected by one or more mobile devices that have been verified to be positioned in a vehicle. Additionally or alternatively, the historical sensor data includes gyroscope data collected and/or generated by other mobile devices of other users who has similar demographic information as the user. For example, the demographic information may include, but not limited to, age, race, ethnicity, gender, marital status, income, education, and/or employment. In certain embodiments, the historical sensor data is defined and provided by an insurer associated with a vehicle of the user. It should be appreciated that, the historical sensor data is stored in the database (e.g., a data storage 436) of the computing device (e.g., a server 406), according to some embodiments.

According to some embodiments, the second predetermined condition is tailored to the user of the mobile device. For example, the second predetermined condition is based upon a life routine or pattern of the user (e.g., a driving pattern) at a particular time of a day, a particular time of a week, a particular time of a month, a particular time of a year, or any combination thereof. In some embodiments, these user data are obtained directly from the user or determined and/or predicted based on the previous sensor data of the user. For example, if the user typically drives 20 miles to and from work between traffic hours (e.g., 8 AM-9 AM and 5 PM-6 PM), 5 days (Mondays to Fridays) a week, the second predetermined condition is determined based upon the gyroscope data previously collected and/or generated during those time periods. It should be appreciated that, in some embodiments, the second predetermined condition is determined based upon the gyroscope data collected and/or generated by other mobile devices of other users who regularly travels or commutes the similar routes during those same time periods.

According to certain embodiments, the second predetermined condition is determined using one or more machine learning algorithms, programs, modules, or models based upon the historical gyroscope data and/or information received from the user. According to some embodiments, the second predetermined condition is defined and provided by the insurer associated with a vehicle of the user.

At the process 214, the third change in the location data (e.g., GPS data) during the time interval between the first time and the second time is determined by comparing the first location data and the second location data. For example, the third change indicates a change in location of the mobile device during the time interval. According to some embodiments, the first location data is used to detect a first location of the mobile device corresponding to the first time, and the second location data is used to detect a second location of the mobile device corresponding to the second time. As such, according to certain embodiments, the second change indicates a speed at which the mobile device has traveled during the time interval.

At the process 216, the computing device determines whether the third change satisfies the third predetermined condition. For example, the third predetermined condition indicates a rate at which the mobile device is expected to travel while driving. According to some embodiments, the third predetermined condition is determined based on historical sensor data of other users. For example, the historical sensor data includes location data generated and/or collected by one or more mobile devices that have been verified to be positioned in a vehicle. Additionally or alternatively, the historical sensor data includes location data collected and/or generated by other mobile devices of other users who has similar demographic information as the user. For example, the demographic information may include, but not limited to, age, race, ethnicity, gender, marital status, income, education, and/or employment. In certain embodiments, the historical sensor data is defined and provided by an insurer associated with a vehicle of the user. It should be appreciated that, the historical sensor data is stored in the database (e.g., a data storage 436) of the computing device (e.g., a server 406), according to some embodiments.

According to some embodiments, the third predetermined condition is tailored to the user of the mobile device. For example, the third predetermined condition is based upon a life routine or pattern of the user (e.g., a driving pattern) at a particular time of a day, a particular time of a week, a particular time of a month, a particular time of a year, or any combination thereof. In some embodiments, these user data are obtained directly from the user or determined and/or predicted based on the previous sensor data of the user. For example, if the user typically drives 20 miles to and from work between traffic hours (e.g., 8 AM-9 AM and 5 PM-6 PM), 5 days (Mondays to Fridays) a week, the third predetermined condition is determined based upon the location data previously collected and/or generated during those time periods. It should be appreciated that, in some embodiments, the third predetermined condition is determined based upon the location data collected and/or generated by other mobile devices of other users who regularly travels or commutes the similar routes during those same time periods.

According to certain embodiments, the third predetermined condition is determined using one or more machine learning algorithms, programs, modules, or models based upon the historical location data and/or information received from the user. According to some embodiments, the third predetermined condition is defined and provided by the insurer associated with a vehicle of the user.

At the process 218, the fourth change in the magnetometer data during the time interval between the first time and the second time is determined by comparing the first magnetometer data and the second magnetometer data. For example, the fourth change indicates a change in directional position of the mobile device (e.g., a direction where the mobile device is facing) during the time interval. According to some embodiments, the first magnetometer data is used to detect a first directional position of the mobile device corresponding to the first time, and the second magnetometer data is used to detect a second directional position of the mobile device corresponding to the second time. As such, according to certain embodiments, the fourth change indicates a change in the direction of the mobile device.

At the process 220, the computing device determines whether the fourth change satisfies the fourth predetermined condition. For example, the fourth predetermined condition indicates one or more changes in the direction of the mobile device that are expected when the mobile device is in a vehicle while driving. According to some embodiments, the fourth predetermined condition is determined based on historical sensor data of other users. For example, the historical sensor data includes magnetometer data generated and/or collected by one or more mobile devices that have been verified to be positioned in a vehicle. Additionally or alternatively, the historical sensor data includes magnetometer data collected and/or generated by other mobile devices of other users who has similar demographic information as the user. For example, the demographic information may include, but not limited to, age, race, ethnicity, gender, marital status, income, education, and/or employment. In certain embodiments, the historical sensor data is defined and provided by an insurer associated with a vehicle of the user. It should be appreciated that, the historical sensor data is stored in the database (e.g., a data storage 436) of the computing device (e.g., a server 406), according to some embodiments.

According to some embodiments, the fourth predetermined condition is tailored to the user of the mobile device. For example, the fourth predetermined condition is based upon a life routine or pattern of the user (e.g., a driving pattern) at a particular time of a day, a particular time of a week, a particular time of a month, a particular time of a year, or any combination thereof. In some embodiments, these user data are obtained directly from the user or determined and/or predicted based on the previous sensor data of the user. For example, if the user typically drives 20 miles to and from work between traffic hours (e.g., 8 AM-9 AM and 5 PM-6 PM), 5 days (Mondays to Fridays) a week, the fourth predetermined condition is determined based upon the magnetometer data previously collected and/or generated during those time periods. It should be appreciated that, in some embodiments, the fourth predetermined condition is determined based upon the magnetometer data collected and/or generated by other mobile devices of other users who regularly travels or commutes the similar routes during those same time periods.

According to certain embodiments, the fourth predetermined condition is determined using one or more machine learning algorithms, programs, modules, or models based upon the historical magnetometer data and/or information received from the user. According to some embodiments, the fourth predetermined condition is defined and provided by the insurer associated with a vehicle of the user.

At the process 222, the computing device determines whether all of the first, second, third, and fourth predetermined conditions are satisfied. In other words, the computing device determines if the changes in linear acceleration, angular velocity, speed, and direction of the mobile device of the user satisfy the predetermined conditions that are expected when the mobile device is in a vehicle.

At the process 224, in response to determining that all of the first, second, third, and fourth predetermined conditions are satisfied, the computing device determines that the mobile device was indeed in a vehicle that the user is driving during the time interval and that the sensor data received during the time interval is reliable. In other words, the application is working properly to transmit the sensor data in response to the mobile device being in the vehicle that the user is driving, according to the illustrative embodiment.

Referring back to the process 222, the computing device further determines whether none of the first, second, third, and fourth predetermined conditions are satisfied. In other words, the computing device determines if none of the changes in linear acceleration, angular velocity, speed, and direction of the mobile device of the user satisfy an of the predetermined conditions that are expected when the mobile device is in a vehicle.

At the process 226, in response to determining that all of the first, second, third, and fourth predetermined conditions are not satisfied, the computing device determines that the mobile device was not in a vehicle during the time interval when the first set of sensor data and the second set of sensor data were generated and/or collected and the sensor data received during the time interval is unreliable. In other words, the application is not working properly to transmit the sensor data in response to the mobile device being in the vehicle that the user is driving, according to the illustrative embodiment.

At the process 228, in response to the determination that the mobile device is not in the vehicle that the user is driving during the time interval, the notification is transmitted to the mobile device indicating that the application does not work properly. In other words, according to some embodiments, the set of sensor data does not adequately represent the driving behavior of the user. As an example, the user driving behavior represents a manner in which the user has operated a vehicle. For example, the user driving behavior indicates the user's driving habits and/or driving patterns.

At the process 230, the computing device updates or adjusts an amount of insurance discount. According to certain embodiments, the user receives an initial discount from an insurer for installing the application and authorizing the application to transmit the set of sensor data collected and/or generated by one or more sensors of the mobile device in response to the mobile device being in the vehicle that the user is driving. For example, as discussed above, the sensor data includes information related to a user activity, such as driving behavior. As an example, the sensor data provided by the application related to the driving behavior of the user is used to generate alert notifications to the user that may reduce the likelihood of a collision or other damage occurring to the vehicle or the user. In other words, because the use of the application functions to mitigate or prevent driving risks upon which an insurance policy is partially based, the insurer provides an additional discount to the user for installing and continuing to use the application according to some embodiments. As such, for example, in response to determining that the application is not working properly to provide the sensor data, the insurance discounts, premiums, rates, points, or programs is calculated, updated, and/or adjusted. In certain embodiments, the updated or adjusted insurance discount, premiums, rates, points, or programs is communicated to the user for the user's review, modification, and/or approval.

At the process 232, the computing device transmits a notification to the user of the mobile device indicating that the amount of insurance discount has been updated or adjusted according to some embodiments. For example, the notification further includes one or more corrective actions that the user may take in order to qualify for one or more insurance discounts.

As discussed above and further emphasized here, FIGS. 2A, 2B and 2C are merely examples, which should not unduly limit the scope of the claims. One of ordinary skill in the art would recognize many variations, alternatives, and modifications. In one embodiment, if one or more predetermined conditions (e.g., one predetermined condition, two predetermined conditions, three predetermined conditions, or all four predetermined conditions) of the first, second, third, and fourth predetermined conditions are satisfied, the process 224 is performed, and if none of the first, second, third, and fourth predetermined conditions are satisfied, the processes 226, 228, 230, and 232 are performed. In another embodiment, if all predetermined conditions of the first, second, third, and fourth predetermined conditions are satisfied, the process 224 is performed, and if one or more predetermined conditions (e.g., one predetermined condition, two predetermined conditions, three predetermined conditions, or all four predetermined conditions) are not satisfied, the processes 226, 228, 230, and 232 are performed.

In yet another embodiment, if at least two predetermined conditions (e.g., two predetermined conditions, three predetermined conditions or all four predetermined conditions) of the first, second, third, and fourth predetermined conditions are satisfied, the process 224 is performed, and if at least three predetermined conditions (e.g., three predetermined conditions or all four predetermined conditions) of the first, second, third, and fourth predetermined conditions are not satisfied, the processes 226, 228, 230, and 232 are performed. In yet another embodiment, if at least three predetermined conditions (e.g., three predetermined conditions or all four predetermined conditions) of the first, second, third, and fourth predetermined conditions are satisfied, the process 224 is performed, and if at least two predetermined conditions (e.g., two predetermined conditions, three predetermined conditions or all four predetermined conditions) of the first, second, third, and fourth predetermined conditions are not satisfied, the processes 226, 228, 230, and 232 are performed.

According to some embodiments, receiving the first set of sensor data from the application installed on the mobile device of the user in the process 102 as shown in FIG. 1 is performed by the process 202 as shown in FIG. 2A. According to certain embodiments, receiving the second set of sensor data from the application installed on the mobile device of the user in the process 104 as shown in FIG. 1 is performed by the process 204 as shown in FIG. 2A. According to some embodiments, determining whether the mobile device is in a vehicle that the user is driving in the process 106 as shown in FIG. 1 is performed by the processes 206-208 as shown in FIG. 2A, the processes 210-220 as shown in FIG. 2B, and the process 222 as shown in FIG. 2C.

According to certain embodiments, transmitting a notification to the mobile device indicating that the application does not work properly in the process 108 is performed by the process 228 as shown in FIG. 2C.

Figure 3A:
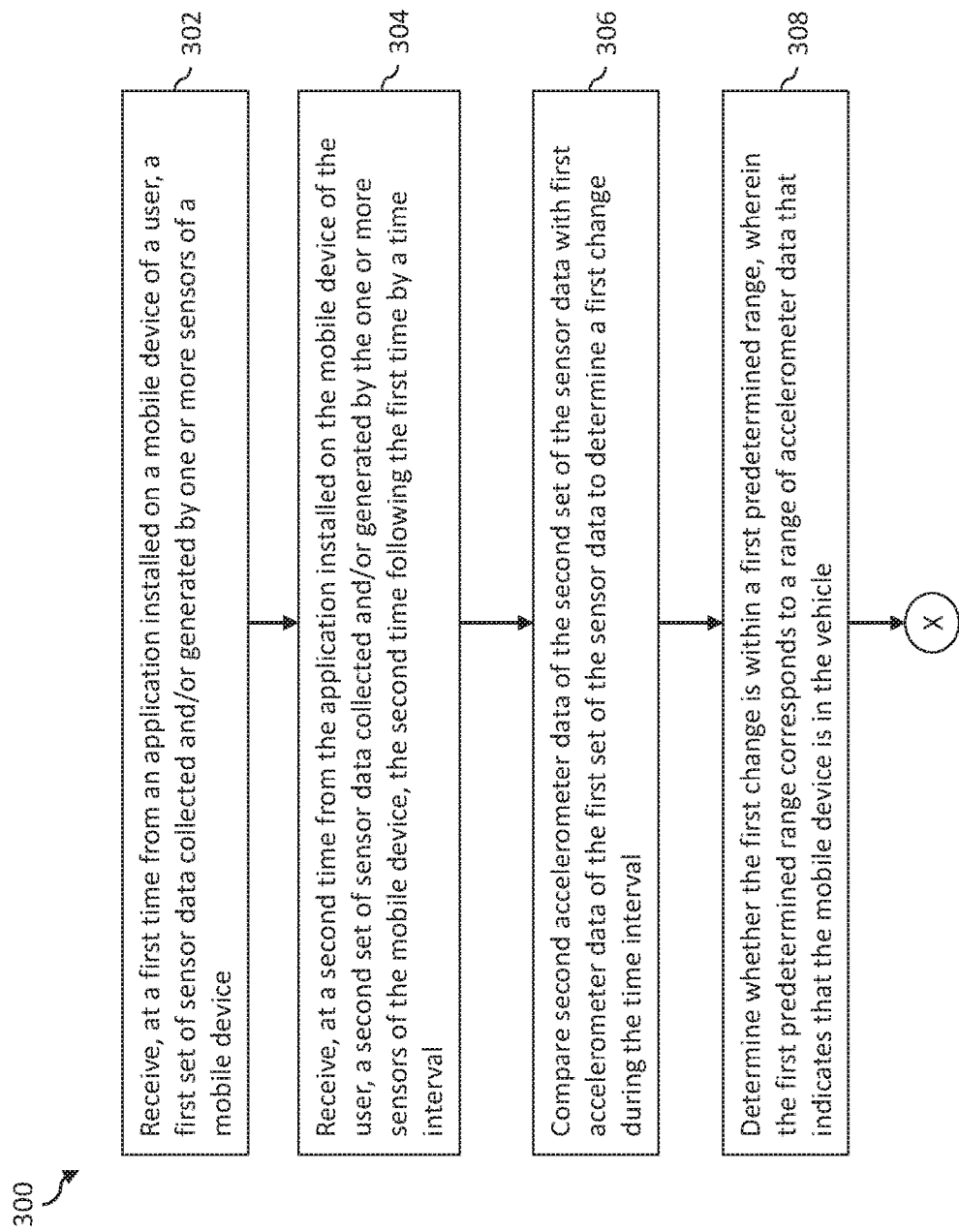
FIGS. 3A, 3B and 3C are simplified diagrams showing a method for verifying a reliability of sensor data received from a mobile device of a user according to certain embodiments of the present disclosure.
Figure 3B:
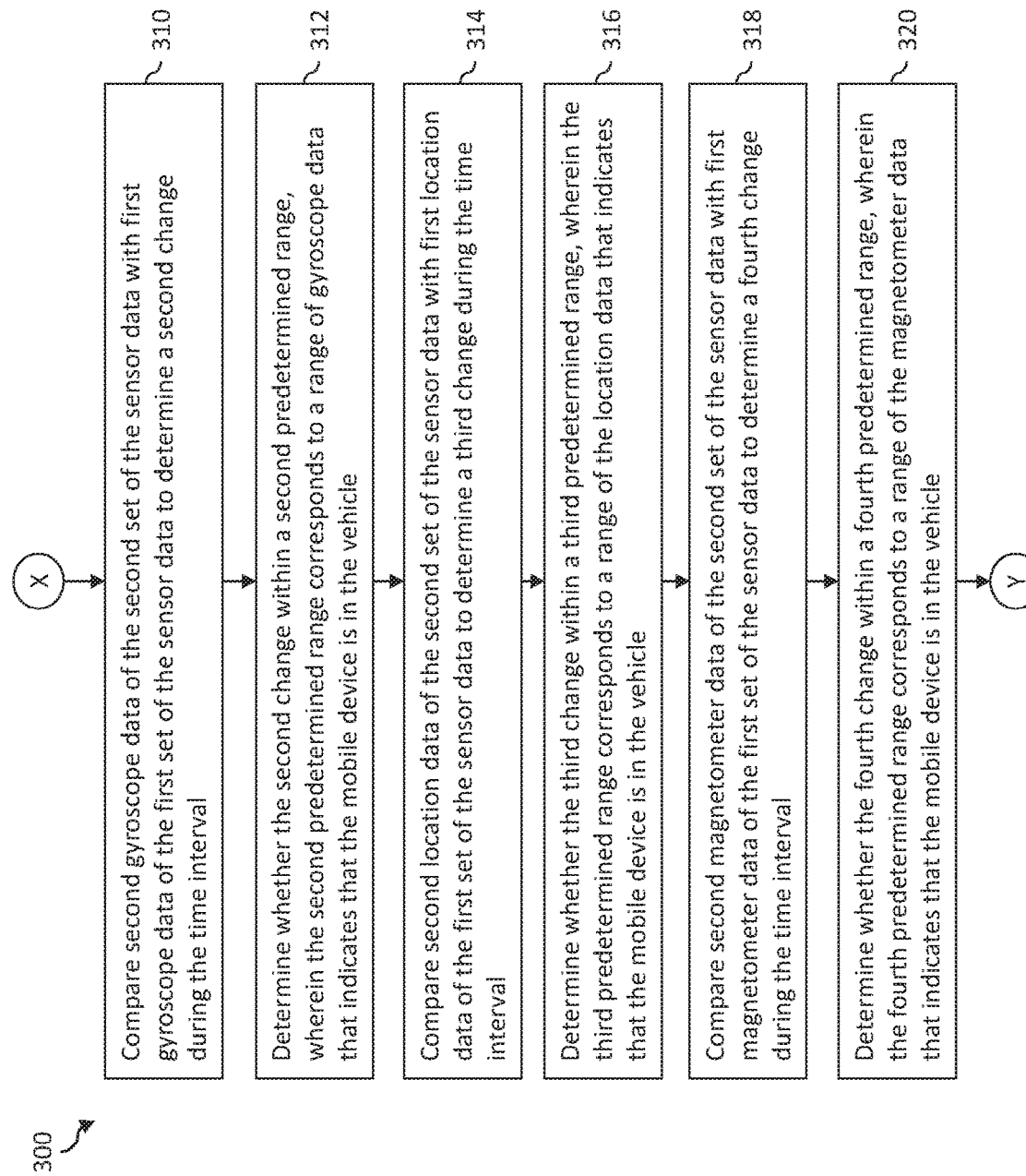
Figure 3C:
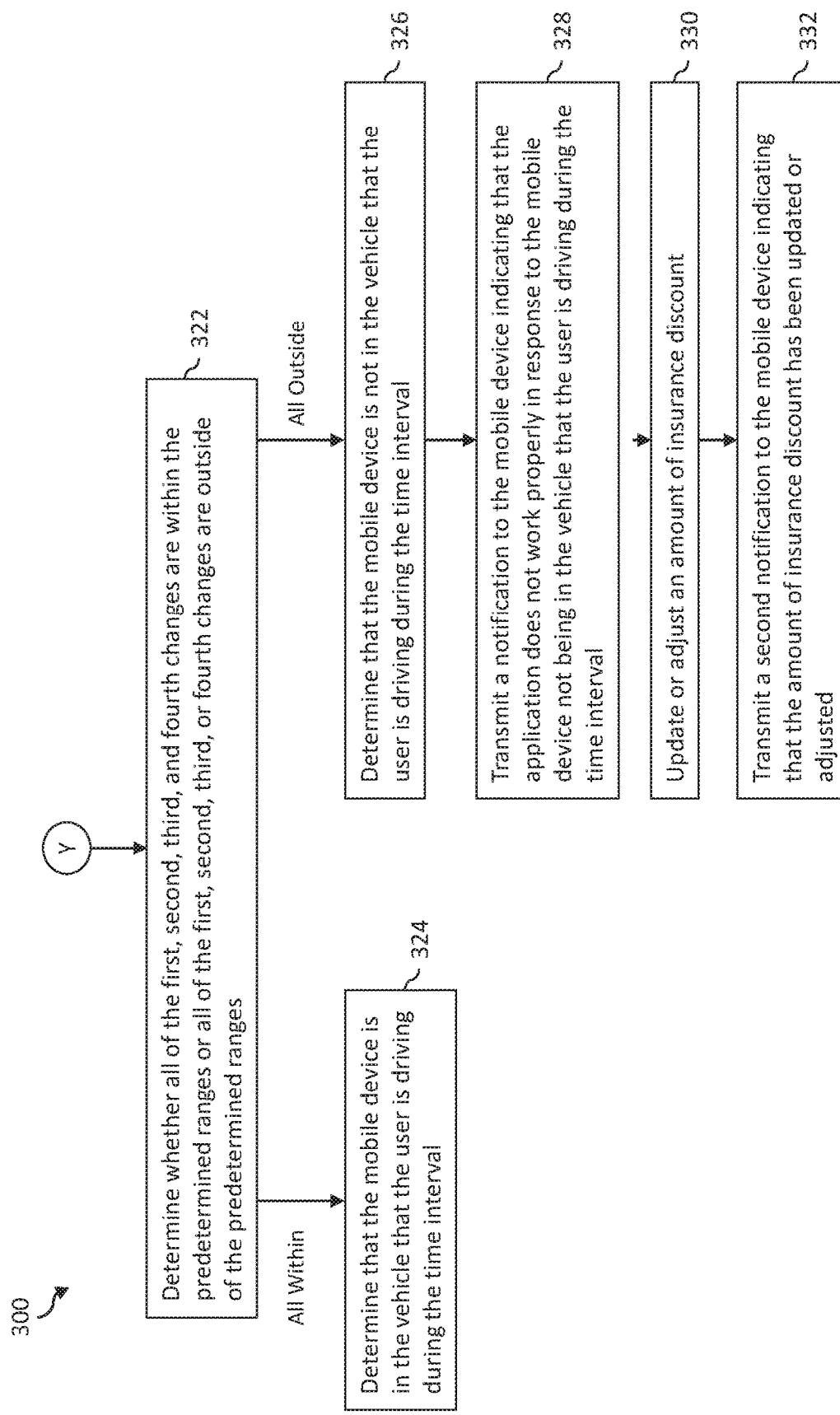

FIGS. 3A, 3B and 3C are simplified diagrams showing a method 300 for verifying a reliability of sensor data received from a mobile device of a user according to certain embodiments of the present disclosure. This diagram is merely an example, which should not unduly limit the scope of the claims. One of ordinary skill in the art would recognize many variations, alternatives, and modifications. In the illustrative embodiment, the method 300 is performed by a computing device (e.g., a server 406 that is communicatively coupled to the mobile device). However, it should be appreciated that, in some embodiments, some of the method 300 is performed by the mobile device.

The method 300 includes process 302 for receiving a first set of sensor data at a first time from an application installed on a mobile device of a user, process 304 for receiving a second set of sensor data at a second time from the application, process 306 for comparing second accelerometer data of the second set of the sensor data with first accelerometer data of the first set of the sensor data to determine a first change during a time interval between the first time and the second time, process 308 for determining whether the first change is within a first predetermined range, process 310 for comparing second gyroscope data of the second set of the sensor data with first gyroscope data of the first set of the sensor data to determine a second change during the time interval, process 312 for determining whether the second change is within a second predetermined range, process 314 for comparing second location data of the second set of the sensor data with first location data of the first set of the sensor data to determine a third change during the time interval, process 316 for determining whether the third change is within a third predetermined range, process 318 for comparing second magnetometer data of the second set of the sensor data with first magnetometer data of the first set of the sensor data to determine a fourth change during the time interval, process 320 for determining whether the fourth change is within a fourth predetermined range, process 322 for determining whether all of the first, second, third, fourth changes are within its respective predetermined range or all of the first, second, third, fourth changes are not within its respective predetermined range, process 324 for determining that the mobile device is in the vehicle that the user is driving during the time interval in response to determining that the all of the first, second, third, fourth changes are within its respective predetermined range, process 326 for determining that the mobile device is not in the vehicle that the user is driving during the time interval in response to determining that the all of the first, second, third, fourth changes are outside of its respective predetermined range, process 328 for transmitting a first notification to the mobile device indicating that the application does not work properly in response to the mobile device not being in the vehicle that the user is driving during the time interval, process 330 for updating or adjusting an amount of insurance discount, and process 332 for transmitting a second notification to the mobile device indicating that the amount of insurance discount has been updated or adjusted.

Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced. For example, although the method 100 is described as performed by the computing device above, some or all processes of the method are performed by any computing device or a processor directed by instructions stored in memory. As an example, some or all processes of the method are performed according to instructions stored in a non-transitory computer-readable medium.

Specifically, at the process 302, the first set of sensor data includes one or more types of sensor data that was collected and/or generated by one or more sensors of the mobile device according to some embodiments. For example, the one or more types of sensor data include a first type for accelerometer data, a second type for gyroscope data, a third type for location data, and a fourth type for magnetometer data. The application that is installed on the mobile device is configured to transmit a first set of sensor data. For example, the application broadcasts the first set of sensor data to be received by nearby devices and/or directly transmits the first set of sensor data to a destination computing device (e.g., a server that is communicatively coupled to the mobile device). In response, the computing device receives the first set of sensor data at the first time.

In the illustrative embodiment, at the time when the application was installed on the mobile device of the user, the application is configured to transmit one or more types of sensor data in response to a determination that the mobile device is in the vehicle that the user is driving. In such embodiment, the first set of sensor data includes information related to a user activity (e.g., driving behavior). As an example, the user driving behavior represents a manner in which the user has operated a vehicle. For example, the user driving behavior indicates the user's driving habits and/or driving patterns.

According to some embodiments, the first set of sensor data indicative of the user driving behavior is collected from one or more sensors associated with the user's mobile device. For example, the one or more sensors include any type and number of accelerometers, gyroscopes, magnetometers, location sensors (e.g., GPS sensors), and/or any other suitable sensors that measure the state and/or movement of the mobile device. In certain embodiments, the first set of sensor data is collected continuously or at predetermined time intervals. According to certain embodiments, the first set of sensor data is collected based on a triggering event. For example, the first set of sensor data is collected when each sensor has acquired a threshold amount of sensor measurements. In other words, the sensor measurements may indicate that the mobile device is in a moving vehicle.

According to certain embodiments, the application is configured to transmit the first set of sensor data periodically every first predetermined time interval when the application is triggered by a predetermined event. In other words, the application may work properly in the background but may not transmit any sensor data until the predetermined event occurs. As an example, this reduces a battery power consumption and preserves battery life. For example, as discussed above, the predetermined event is a driving event. According to certain embodiments, the application determines the driving event based on the sensor data collected or generated by the mobile device. Additionally or alternatively, the application receives an input from the user that indicates that the user is driving according to certain embodiments. However, it should be appreciated that, in some embodiments, the application periodically transmits sensor data every predetermined time interval.

At the process 304, the application that is installed on the mobile device is configured to transmit the second set of sensor data that was collected and/or generated by one or more sensors of the mobile device according to some embodiments. For example, the application broadcasts the second set of sensor data to be received by nearby devices and/or directly transmits the second set of sensor data to a destination computing device (e.g., a server that is communicatively coupled to the mobile device). In response, the computing device receives the second set of sensor data at the second time. In the illustrative embodiment, the second set of sensor data is a set of sensor data that is received from the mobile device by the computing device subsequent to receiving the first set of sensor data. In other words, the second time follows the first time by a time interval. It should be appreciated that, in certain embodiments, the second set of sensor data includes sensor data that has been collected or generated from the same sensors of the mobile device that generated the first set of sensor data.

According to certain embodiments, the second set of sensor data includes information related to a user activity (e.g., driving behavior). As an example, the user driving behavior represents a manner in which the user has operated a vehicle. For example, the user driving behavior indicates the user's driving habits and/or driving patterns.

According to some embodiments, the second set of sensor data indicative of the user driving behavior is collected from one or more sensors associated with the user's mobile device. For example, the one or more sensors include any type and number of accelerometers, gyroscopes, magnetometers, location sensors (e.g., GPS sensors), and/or any other suitable sensors that measure the state and/or movement of the mobile device. According to certain embodiments, the second set of sensor data is collected based on a triggering event. As discussed above, in the illustrative embodiment, the application is configured to transmit a set of sensor data when the application is triggered by driving event (i.e., the predetermined event). According to certain embodiments, the application determines the driving event based at least upon sensor data collected and/or generated by one or more sensors of the mobile device and/or user input. In other words, the application may work properly in the background and may not transmit any sensor data until the predetermined event occurs. As an example, this reduces a battery power consumption and preserves battery life.

At the processes 306, 308, 310, 312, 314, 316, 318, and 320, the computing device determines whether the mobile device is in a vehicle that the user is driving during a time interval between the first time and the second time based at least upon the first set of sensor data and the second set of sensor data received from the mobile device. As discussed above, when the application is initially installed on the mobile device, the application is configured to only transmit the sensor data that was collected and/or generated by the one or more sensors of the mobile device while the mobile device is in a vehicle that the user is driving. In other words, theoretically, the sensor data that was received from the application should represent sensor data that was collected and/or generated by the mobile device while the mobile device was in a vehicle. However, in real life, the sensor data received from the application may not be reliable for various reasons. To verify that the application is working properly and that the set of sensor data received from the application is reliable, the computing device determines whether the first set of sensor data and the second set of sensor data were generated and/or collected while the mobile device was indeed in a vehicle.

In the illustrative embodiment, the first sensor data includes first accelerometer data corresponding to the first time, first gyroscope data corresponding to the first time, first location data corresponding to the first time, and first magnetometer data corresponding to the first time. The second sensor data includes second accelerometer data corresponding to the second time, second gyroscope data corresponding to the second time, second location data corresponding to the second time, and second magnetometer data corresponding to the second time.

Specifically, at the process 306, the first change in the accelerometer data during the time interval between the first time and the second time is determined by comparing the first accelerometer data and the second accelerometer data. For example, the first change indicates a change in movement of the mobile device during the time interval. According to some embodiments, the first accelerometer data is used to detect a first linear acceleration of movement of the mobile device corresponding to the first time, and the second accelerometer data is used to detect a second linear acceleration of movement of the mobile device corresponding to the second time. As such, according to certain embodiments, the first change indicates a change in the linear acceleration of movement of the mobile device.

At the process 308, the computing device determines whether the first change is within the first predetermined range. For example, the first predetermined range indicates a range of movements of the mobile device that is expected when the mobile device is in a vehicle while driving. According to some embodiments, the first predetermined range is determined based on historical sensor data of other users. For example, the historical sensor data includes accelerometer data generated and/or collected by one or more mobile devices that have been verified to be positioned in a vehicle. Additionally or alternatively, the historical sensor data includes accelerometer data collected and/or generated by other mobile devices of other users who has similar demographic information as the user. For example, the demographic information may include, but not limited to, age, race, ethnicity, gender, marital status, income, education, and/or employment. In certain embodiments, the historical sensor data is defined and provided by an insurer associated with a vehicle of the user. It should be appreciated that, the historical sensor data is stored in the database (e.g., a data storage 436) of the computing device (e.g., a server 406), according to some embodiments.

According to some embodiments, the first predetermined range is tailored to the user of the mobile device. For example, the first predetermined range is based upon a life routine or pattern of the user (e.g., a driving pattern) at a particular time of a day, a particular time of a week, a particular time of a month, a particular time of a year, or any combination thereof. In some embodiments, these user data are obtained directly from the user or determined and/or predicted based on the previous sensor data of the user. For example, if the user typically drives 20 miles to and from work between traffic hours (e.g., 8 AM-9 AM and 5 PM-6 PM), 5 days (Mondays to Fridays) a week, the first predetermined range is determined based upon the accelerometer data previously collected and/or generated during those time periods. It should be appreciated that, in some embodiments, the first predetermined range is determined based upon the accelerometer data collected and/or generated by other mobile devices of other users who regularly travels or commutes the similar routes during those same time periods.

According to certain embodiments, the first predetermined range is determined using one or more machine learning algorithms, programs, modules, or models based upon the historical accelerometer data and/or information received from the user. According to some embodiments, the first predetermined range is defined and provided by the insurer associated with a vehicle of the user.

At the process 310, the second change in the gyroscope data during the time interval between the first time and the second time is determined by comparing the first gyroscope data and the second gyroscope data. For example, the second change indicates a change in rotational position or angular velocity of the mobile device during the time interval. According to some embodiments, the first gyroscope data is used to detect a first rotational position of the mobile device corresponding to the first time, and the second gyroscope data is used to detect a second rotational position of the mobile device corresponding to the second time. As such, according to certain embodiments, the second change indicates a change in the angular velocity of the mobile device.

At the process 312, the computing device determines whether the second change is within the second predetermined range. For example, the second predetermined range indicates a range of angular velocity of the mobile device that is expected when the mobile device is in a vehicle while driving. According to some embodiments, the second predetermined range is determined based on historical sensor data of other users. For example, the historical sensor data includes gyroscope data generated and/or collected by one or more mobile devices that have been verified to be positioned in a vehicle. Additionally or alternatively, the historical sensor data includes gyroscope data collected and/or generated by other mobile devices of other users who has similar demographic information as the user. For example, the demographic information may include, but not limited to, age, race, ethnicity, gender, marital status, income, education, and/or employment. In certain embodiments, the historical sensor data is defined and provided by an insurer associated with a vehicle of the user. It should be appreciated that, the historical sensor data is stored in the database (e.g., a data storage 436) of the computing device (e.g., a server 406), according to some embodiments.

According to some embodiments, the second predetermined range is tailored to the user of the mobile device. For example, the second predetermined range is based upon a life routine or pattern of the user (e.g., a driving pattern) at a particular time of a day, a particular time of a week, a particular time of a month, a particular time of a year, or any combination thereof. In some embodiments, these user data are obtained directly from the user or determined and/or predicted based on the previous sensor data of the user. For example, if the user typically drives 20 miles to and from work between traffic hours (e.g., 8 AM-9 AM and 5 PM-6 PM), 5 days (Mondays to Fridays) a week, the second predetermined range is determined based upon the gyroscope data previously collected and/or generated during those time periods. It should be appreciated that, in some embodiments, the second predetermined range is determined based upon the gyroscope data collected and/or generated by other mobile devices of other users who regularly travels or commutes the similar routes during those same time periods.

According to certain embodiments, the second predetermined range is determined using one or more machine learning algorithms, programs, modules, or models based upon the historical gyroscope data and/or information received from the user. According to some embodiments, the second predetermined range is defined and provided by the insurer associated with a vehicle of the user.

At the process 314, the third change in the location data (e.g., GPS data) during the time interval between the first time and the second time is determined by comparing the first location data and the second location data. For example, the third change indicates a change in location of the mobile device during the time interval. According to some embodiments, the first location data is used to detect a first location of the mobile device corresponding to the first time, and the second location data is used to detect a second location of the mobile device corresponding to the second time. As such, according to certain embodiments, the second change indicates a speed at which the mobile device has traveled during the time interval.

At the process 316, the computing device determines whether the third change is within the third predetermined range. For example, the third predetermined range indicates a range of speed at which the mobile device is expected to travel while driving. According to some embodiments, the third predetermined range is determined based on historical sensor data of other users. For example, the historical sensor data includes location data generated and/or collected by one or more mobile devices that have been verified to be positioned in a vehicle. Additionally or alternatively, the historical sensor data includes location data collected and/or generated by other mobile devices of other users who has similar demographic information as the user. For example, the demographic information may include, but not limited to, age, race, ethnicity, gender, marital status, income, education, and/or employment. In certain embodiments, the historical sensor data is defined and provided by an insurer associated with a vehicle of the user. It should be appreciated that, the historical sensor data is stored in the database (e.g., a data storage 436) of the computing device (e.g., a server 406), according to some embodiments.

According to some embodiments, the third predetermined range is tailored to the user of the mobile device. For example, the third predetermined range is based upon a life routine or pattern of the user (e.g., a driving pattern) at a particular time of a day, a particular time of a week, a particular time of a month, a particular time of a year, or any combination thereof. In some embodiments, these user data are obtained directly from the user or determined and/or predicted based on the previous sensor data of the user. For example, if the user typically drives 20 miles to and from work between traffic hours (e.g., 8 AM-9 AM and 5 PM-6 PM), 5 days (Mondays to Fridays) a week, the third predetermined range is determined based upon the location data previously collected and/or generated during those time periods. It should be appreciated that, in some embodiments, the third predetermined range is determined based upon the location data collected and/or generated by other mobile devices of other users who regularly travels or commutes the similar routes during those same time periods.

According to certain embodiments, the third predetermined range is determined using one or more machine learning algorithms, programs, modules, or models based upon the historical location data and/or information received from the user. According to some embodiments, the third predetermined range is defined and provided by the insurer associated with a vehicle of the user.

At the process 318, the fourth change in the magnetometer data during the time interval between the first time and the second time is determined by comparing the first magnetometer data and the second magnetometer data. For example, the fourth change indicates a change in directional position of the mobile device (i.e., a direction where the mobile device is facing) during the time interval. According to some embodiments, the first magnetometer data is used to detect a first directional position of the mobile device corresponding to the first time, and the second magnetometer data is used to detect a second directional position of the mobile device corresponding to the second time. As such, according to certain embodiments, the fourth change indicates a change in the direction of the mobile device.

At the process 320, the computing device determines whether the fourth change is within the fourth predetermined range. For example, the fourth predetermined range indicates a range of direction of the mobile device that are expected when the mobile device is in a vehicle while driving. According to some embodiments, the fourth predetermined range is determined based on historical sensor data of other users. For example, the historical sensor data includes magnetometer data generated and/or collected by one or more mobile devices that have been verified to be positioned in a vehicle. Additionally or alternatively, the historical sensor data includes magnetometer data collected and/or generated by other mobile devices of other users who has similar demographic information as the user. For example, the demographic information may include, but not limited to, age, race, ethnicity, gender, marital status, income, education, and/or employment. In certain embodiments, the historical sensor data is defined and provided by an insurer associated with a vehicle of the user. It should be appreciated that, the historical sensor data is stored in the database (e.g., a data storage 436) of the computing device (e.g., a server 406), according to some embodiments.

According to some embodiments, the fourth predetermined range is tailored to the user of the mobile device. For example, the fourth predetermined range is based upon a life routine or pattern of the user (e.g., a driving pattern) at a particular time of a day, a particular time of a week, a particular time of a month, a particular time of a year, or any combination thereof. In some embodiments, these user data are obtained directly from the user or determined and/or predicted based on the previous sensor data of the user. For example, if the user typically drives 20 miles to and from work between traffic hours (e.g., 8 AM-9 AM and 5 PM-6 PM), 5 days (Mondays to Fridays) a week, the fourth predetermined range is determined based upon the magnetometer data previously collected and/or generated during those time periods. It should be appreciated that, in some embodiments, the fourth predetermined range is determined based upon the magnetometer data collected and/or generated by other mobile devices of other users who regularly travels or commutes the similar routes during those same time periods.

According to certain embodiments, the fourth predetermined range is determined using one or more machine learning algorithms, programs, modules, or models based upon the historical magnetometer data and/or information received from the user. According to some embodiments, the fourth predetermined range is defined and provided by the insurer associated with a vehicle of the user.

At the process 322, the computing device determines whether all of the first, second, third, and fourth changes are within the first, second, third, and fourth predetermined ranges, respectively. In other words, the computing device determines if the changes in linear acceleration, angular velocity, speed, and direction of the mobile device of the user is within the predetermined ranges that are expected when the mobile device is in a vehicle.

At the process 324, in response to determining that all of the first, second, third, and fourth changes are within the first, second, third, and fourth predetermined ranges, respectively, the computing device determines that the mobile device was indeed in a vehicle that the user is driving during the time interval and that the sensor data received during the time interval is reliable. In other words, the application is working properly to transmit the sensor data in response to the mobile device being in the vehicle that the user is driving, according to the illustrative embodiment.

Referring back to the process 322, the computing device further determines whether all of the first, second, third, and fourth changes are outside of the first, second, third, and fourth predetermined ranges, respectively. In other words, the computing device determines if none of the changes in linear acceleration, angular velocity, speed, and direction of the mobile device of the user are within the predetermined ranges that are expected when the mobile device is in a vehicle.

At the process 326, in response to determining that all of the first, second, third, and fourth changes are outside of the first, second, third, and fourth predetermined ranges, respectively, the computing device determines that the mobile device was not in a vehicle during the time interval when the first set of sensor data and the second set of sensor data were generated and/or collected and the sensor data received during the time interval is unreliable. In other words, the application is not working properly to transmit the sensor data in response to the mobile device being in the vehicle that the user is driving, according to the illustrative embodiment.

At the process 328, in response to the determination that the mobile device is not in the vehicle that the user is driving during the time interval, the notification is transmitted to the mobile device indicating that the application does not work properly. In other words, according to some embodiments, the set of sensor data does not adequately represent the driving behavior of the user. As an example, the user driving behavior represents a manner in which the user has operated a vehicle. For example, the user driving behavior indicates the user's driving habits and/or driving patterns.

At the process 330, the computing device updates or adjusts an amount of insurance discount. According to certain embodiments, the user receives an initial discount from an insurer for installing the application and authorizing the application to transmit the set of sensor data collected and/or generated by one or more sensors of the mobile device in response to the mobile device being in the vehicle that the user is driving. For example, as discussed above, the sensor data includes information related to a user activity, such as driving behavior. As an example, the sensor data provided by the application related to the driving behavior of the user is used to generate alert notifications to the user that may reduce the likelihood of a collision or other damage occurring to the vehicle or the user. In other words, because the use of the application functions to mitigate or prevent driving risks upon which an insurance policy is partially based, the insurer provides an additional discount to the user for installing and continuing to use the application according to some embodiments. As such, for example, in response to determining that the application is not working properly to provide the sensor data, the insurance discounts, premiums, rates, points, or programs is calculated, updated, and/or adjusted. In certain embodiments, the updated or adjusted insurance discount, premiums, rates, points, or programs is communicated to the user for the user's review, modification, and/or approval.

At the process 332, the computing device transmits a notification to the user of the mobile device indicating that the amount of insurance discount has been updated or adjusted according to some embodiments. For example, the notification further includes one or more corrective actions that the user may take in order to qualify for one or more insurance discounts.

According to some embodiments, receiving the first set of sensor data from the application installed on the mobile device of the user in the process 102 as shown in FIG. 1 and/or the process 202 as shown in FIG. 2A is performed by the process 302 as shown in FIG. 3A. According to certain embodiments, receiving the second set of sensor data from the application installed on the mobile device of the user in the process 104 as shown in FIG. 1 and/or the process 204 as shown in FIG. 2A is performed by the process 304 as shown in FIG. 3A. According to some embodiments, determining whether the mobile device is in a vehicle that the user is driving in the process 106 as shown in FIG. 1 and/or the processes 206-208 as shown in FIG. 2A, the processes 10-220 as shown in FIG. 2B, and the process 222 as shown in FIG. 2C is performed by the processes 306-308 as shown in FIG. 3A, the processes 310-320 as shown in FIG. 3B, and the process 322 as shown in FIG. 3C. According to certain embodiments, transmitting a notification to the mobile device indicating that the application does not work properly in the process 108 and/or the process 228 as shown in FIG. 2C is performed by the process 328 as shown in FIG. 3C.

As discussed above and further emphasized here, FIGS. 3A, 3B and 3C are merely examples, which should not unduly limit the scope of the claims. One of ordinary skill in the art would recognize many variations, alternatives, and modifications. In one embodiment, if one or more changes (e.g., one change, two changes, three changes, or all four changes) of the first, second, third, and fourth changes are within one or more corresponding predetermined ranges, the process 324 is performed, and if none of the first, second, third, and fourth changes are within their corresponding predetermined ranges, the processes 326, 328, 330, and 332 are performed. In another embodiment, if all changes of the first, second, third, and fourth changes are within their corresponding predetermined ranges, the process 324 is performed, and if one or more changes (e.g., one change, two changes, three changes, or all four changes) are not within (e.g., outside) their corresponding predetermined ranges, the processes 326, 328, 330, and 332 are performed.

In yet another embodiment, if at least two changes (e.g., two changes, three changes or all four changes) of the first, second, third, and fourth changes are within their corresponding predetermined ranges, the process 324 is performed, and if at least three changes (e.g., three changes or all four changes) of the first, second, third, and fourth changes are not within (e.g., outside) their corresponding predetermined ranges, the processes 326, 328, 330, and 332 are performed. In yet another embodiments, if at least three changes (e.g., three changes or all four changes) of the first, second, third, and fourth changes are within their corresponding ranges, the process 324 is performed, and if at least two changes (e.g., two changes, three changes or all four changes) of the first, second, third, and fourth changes are not within (e.g., outside) their corresponding ranges, the processes 326, 328, 330, and 332 are performed.

II. One or More Systems for Determining a Status of a Mobile Device According to Certain Embodiments FIG. 4 is a simplified diagram showing a system for verifying a reliability of sensor data received from a mobile device of a user according to certain embodiments of the present disclosure. This diagram is merely an example, which should not unduly limit the scope of the claims. One of ordinary skill in the art would recognize many variations, alternatives, and modifications. In the illustrative embodiment, the system 400 includes a mobile device 402, a network 404, and a server 406. Although the above has been shown using a selected group of components for the system, there can be many alternatives, modifications, and variations. For example, some of the components may be expanded and/or combined. Other components may be inserted to those noted above. Depending upon the embodiment, the arrangement of components may be interchanged with others replaced.

In various embodiments, the system 400 is used to implement the method 100, the method 200, and/or the method 300. According to certain embodiments, the mobile device 402 is communicatively coupled to the server 406 via the network 404. As an example, the mobile device 402 includes one or more processors 416 (e.g., a central processing unit (CPU), a graphics processing unit (GPU)), a memory 418 (e.g., random-access memory (RAM), read-only memory (ROM), flash memory), a communications unit 420 (e.g., a network transceiver), a display unit 422 (e.g., a touchscreen), and one or more sensors 424 (e.g., an accelerometer, a gyroscope, a magnetometer, a location sensor). For example, the one or more sensors 424 are configured to generate sensor data. According to some embodiments, the data are collected continuously, at predetermined time intervals, and/or based on a triggering event (e.g., when each sensor has acquired a threshold amount of sensor measurements).

In some embodiments, the mobile device 402 is operated by the user. For example, the user installs an application associated with an insurer on the mobile device 402 and allows the application to communicate with the one or more sensors 424 to collect sensor data. According to some embodiments, the application collects the sensor data continuously, at predetermined time intervals, and/or based on a triggering event (e.g., when each sensor has acquired a threshold amount of sensor measurements). In certain embodiments, the sensor data represents the user's activity/behavior, such as the user driving behavior, in the method 100, the method 200, and/or the method 300.

According to certain embodiments, the collected data are stored in the memory 418 before being transmitted to the server 406 using the communications unit 422 via the network 404 (e.g., via a local area network (LAN), a wide area network (WAN), the Internet). In some embodiments, the collected data are transmitted directly to the server 406 via the network 404. In certain embodiments, the collected data are transmitted to the server 406 via a third party. For example, a data monitoring system stores any and all data collected by the one or more sensors 424 and transmits those data to the server 406 via the network 404 or a different network.

According to certain embodiments, the server 406 includes a processor 430 (e.g., a microprocessor, a microcontroller), a memory 432, a communications unit 434 (e.g., a network transceiver), and a data storage 436 (e.g., one or more databases). In some embodiments, the server 406 is a single server, while in certain embodiments, the server 406 includes a plurality of servers with distributed processing. As an example, in FIG. 4, the data storage 436 is shown to be part of the server 406. In some embodiments, the data storage 436 is a separate entity coupled to the server 406 via a network such as the network 404. In certain embodiments, the server 406 includes various software applications stored in the memory 432 and executable by the processor 430. For example, these software applications include specific programs, routines, or scripts for performing functions associated with the method 100, the method 200, and/or the method 300. As an example, the software applications include general-purpose software applications for data processing, network communication, database management, web server operation, and/or other functions typically performed by a server.

According to various embodiments, the server 406 receives, via the network 404, the sensor data collected by the one or more sensors 424 from the application using the communications unit 434 and stores the data in the data storage 436. For example, the server 406 then processes the data to perform one or more processes of the method 100, one or more processes of the method 200, and/or one or more processes of the method 300.

According to certain embodiments, the notification in response to the application being determined not working properly in the method 100, the method 200, and/or the method 300 is transmitted back to the mobile device 402, via the network 404, to be provided (e.g., displayed) to the user via the display unit 422.

In some embodiments, one or more processes of the method 100, one or more processes of the method 200, and/or one or more processes of the method 300 are performed by the mobile device 402. For example, the processor 416 of the mobile device 402 processes the data collected by the one or more sensors 424 to perform one or more processes of the method 100, one or more processes of the method 200, and/or one or more processes of the method 300.

III. EXAMPLES OF CERTAIN EMBODIMENTS OF THE PRESENT DISCLOSURE

According to some embodiments, a method for determining a status of a mobile device of a user includes receiving first sensor data at a first time from an application installed on a mobile device of a user and determining a first location of the mobile device based at least in part upon the first sensor data. The first location corresponds to the first time. The method further includes immediately subsequent to receiving the first sensor data at the first time, receiving second sensor data at a second time from the application and determining a second location of the mobile device based at least in part upon the second sensor data. The second time follows the first time by a time interval, and the second location corresponds to the second time. Additionally, the method includes determining a distance between the first location and the second location. The distance corresponds to the time interval from the first time to the second time. Moreover, the method includes determining whether the distance corresponding to the time interval exceeds a predetermined threshold and determining whether a trip log indicative of at least one trip during the time interval is received from the application. For example, the method is implemented according to at least FIG. 1, FIGS. 2A, 2B and 2C, and/or FIGS. 3A, 3B and 3C.

According to certain embodiments, a computing device for determining a status of a mobile device of a user includes one or more processors and a memory that stores instructions for execution by the one or more processors. The instructions, when executed, cause the one or more processors to receive first sensor data at a first time from an application installed on a mobile device of a user and determine a first location of the mobile device based at least in part upon the first sensor data. The first location corresponds to the first time. Also, the instructions, when executed, cause the one or more processors to immediately subsequent to receiving the first sensor data at the first time, receive second sensor data at a second time from the application and determine a second location of the mobile device based at least in part upon the second sensor data. The second time follows the first time by a time interval, and the second location corresponds to the second time. Additionally, the instructions, when executed, cause the one or more processors to determine a distance between the first location and the second location. The distance corresponds to the time interval from the first time to the second time. Moreover, the instructions, when executed, cause the one or more processors to determine whether the distance corresponding to the time interval exceeds a predetermined threshold and determine whether a trip log indicative of at least one trip during the time interval is received from the application. For example, the computing device is implemented according to at least FIG. 4.

According to some embodiments, a non-transitory computer-readable medium stores instructions for determining a status of a mobile device of a user. The instructions are executed by one or more processors of a computing device. The non-transitory computer-readable medium includes instructions to receive first sensor data at a first time from an application installed on a mobile device of a user and determine a first location of the mobile device based at least in part upon the first sensor data. The first location corresponds to the first time. Also, the non-transitory computer-readable medium includes instructions to immediately subsequent to receiving the first sensor data at the first time, receive second sensor data at a second time from the application and determine a second location of the mobile device based at least in part upon the second sensor data. The second time follows the first time by a time interval, and the second location corresponds to the second time. Additionally, the non-transitory computer-readable medium includes instructions to determine a distance between the first location and the second location. The distance corresponds to the time interval from the first time to the second time. Moreover, the non-transitory computer-readable medium includes instructions to determine whether the distance corresponding to the time interval exceeds a predetermined threshold and determine whether a trip log indicative of at least one trip during the time interval is received from the application. For example, the non-transitory computer-readable medium is implemented according to at least FIG. 1, FIGS. 2A, 2B and 2C, FIGS. 3A, 3B and 3C, and/or FIG. 4.

IV. Examples of Machine Learning According to Certain Embodiments

According to some embodiments, a processor or a processing element may be trained using supervised machine learning and/or unsupervised machine learning, and the machine learning may employ an artificial neural network, which, for example, may be a convolutional neural network, a recurrent neural network, a deep learning neural network, a reinforcement learning module or program, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

According to certain embodiments, machine learning programs may be trained by inputting sample data sets or certain data into the programs, such as images, object statistics and information, historical estimates, and/or actual repair costs. The machine learning programs may utilize deep learning algorithms that may be primarily focused on pattern recognition and may be trained after processing multiple examples. The machine learning programs may include Bayesian Program Learning (BPL), voice recognition and synthesis, image or object recognition, optical character recognition, and/or natural language processing. The machine learning programs may also include natural language processing, semantic analysis, automatic reasoning, and/or other types of machine learning.

According to some embodiments, supervised machine learning techniques and/or unsupervised machine learning techniques may be used. In supervised machine learning, a processing element may be provided with example inputs and their associated outputs and may seek to discover a general rule that maps inputs to outputs, so that when subsequent novel inputs are provided the processing element may, based upon the discovered rule, accurately predict the correct output. In unsupervised machine learning, the processing element may need to find its own structure in unlabeled example inputs.

V. Additional Considerations According to Certain Embodiments

For example, some or all components of various embodiments of the present disclosure each are, individually and/or in combination with at least another component, implemented using one or more software components, one or more hardware components, and/or one or more combinations of software and hardware components. As an example, some or all components of various embodiments of the present disclosure each are, individually and/or in combination with at least another component, implemented in one or more circuits, such as one or more analog circuits and/or one or more digital circuits. For example, while the embodiments described above refer to particular features, the scope of the present disclosure also includes embodiments having different combinations of features and embodiments that do not include all of the described features. As an example, various embodiments and/or examples of the present disclosure can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Certain implementations may also be used, however, such as firmware or even appropriately designed hardware configured to perform the methods and systems described herein.

The systems' and methods' data (e.g., associations, mappings, data input, data output, intermediate data results, final data results) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include mobile devices and servers. A mobile device and server are generally remote from each other and typically interact through a communication network. The relationship of mobile device and server arises by virtue of computer programs running on the respective computers and having a mobile device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present disclosure have been described, it will be understood by those of skill in the art that there are other embodiments that are equivalent to the described embodiments. Accordingly, it is to be understood that the present disclosure is not to be limited by the specific illustrated embodiments.

What is claimed is:

1. A computer-implemented method for verifying a reliability of sensor data collected by an application installed on a mobile device of a user and configured to cause one or more sensors of the mobile device to generate the sensor data in response to the mobile device being in a vehicle, comprising:
    collecting, at a first time by the mobile device, first sensor data;

collecting, at a second time by the mobile device, second sensor data, the second time following the first time by a time interval;

determining whether the mobile device is in the vehicle during the time interval based at least upon the first sensor data and the second sensor data; and in response to the mobile device not being in the vehicle during the time interval, determining that the reliability of the sensor data is not verified.

2. The method of claim 1, further comprising generating a notification on the mobile device indicating that the application does not work properly in response to determining that the reliability of the sensor data is not verified.

3. The method of claim 1, further comprising generating a notification on the mobile device indicating that an amount of an insurance discount has been updated or adjusted.

4. The method of claim 1, wherein:
the first sensor data includes first accelerometer data, first gyroscope data, first location data, and first magnetometer data; and
the second sensor data includes second accelerometer data, second gyroscope data, second location data, and second magnetometer data.

5. The method of claim 4, wherein determining whether the mobile device is in the vehicle during the time interval includes:
comparing the second accelerometer data with the first accelerometer data to determine a first change during the time interval; and
determining whether the first change satisfies a first predetermined condition.

6. The method of claim 5, wherein determining whether the mobile device is in the vehicle during the time interval includes:
comparing the second gyroscope data with the first gyroscope data to determine a second change during the time interval; and
determining whether the second change satisfies a second predetermined condition.

7. The method of claim 6, wherein determining whether the mobile device is in the vehicle during the time interval includes:
comparing the second location data with the first location data to determine a third change during the time interval; and
determining whether the third change satisfies a third predetermined condition.

8. The method of claim 7, wherein determining whether the mobile device is in the vehicle during the time interval includes:
comparing the second magnetometer data with the first magnetometer data to determine a fourth change during the time interval; and
determining whether the fourth change satisfies a fourth predetermined condition.

9. The method of claim 8, wherein determining whether the mobile device is in the vehicle during the time interval includes:
in response to determining that each of the first, second, third, and fourth changes does not satisfy the first, second, third, and fourth predetermined condition, respectively, determining that the mobile device is not in the vehicle during the time interval.

10. The method of claim 4, wherein determining whether the mobile device is in the vehicle during the time interval includes:

evaluating, over the time interval, a first change between the first accelerometer data and the second accelerometer data, a second change between the first gyroscope data and the second gyroscope data, a third change between the first location data and the second magnetometer data, and a fourth change between the first magnetometer data and the second magnetometer data; and determining that the mobile device is not in the vehicle during the time interval in response to the first change not satisfying a first predetermined condition, the second change not satisfying a second predetermined condition, the third change not satisfying a third predetermined condition, and the fourth change not satisfying a fourth predetermined condition.

11. The method of claim 10, wherein determining whether the first change satisfies the first predetermined condition includes determining whether the first change is within a first predetermined range of accelerometer data that indicates the mobile device is in the vehicle.

12. The method of claim 11, wherein determining whether the second change satisfies the second predetermined condition includes determining whether the second change is within a second predetermined range of gyroscope data that indicates the mobile device is in the vehicle.

13. The method of claim 12, wherein determining whether the third change satisfies the third predetermined condition includes determining whether the third change is within a third predetermined range of location data that indicates the mobile device is in the vehicle.

14. The method of claim 13, wherein determining whether the fourth change satisfies the fourth predetermined condition includes determining whether the fourth change is within a fourth predetermined range of magnetometer data that indicates the mobile device is in the vehicle.

15. The method of claim 14, wherein determining whether the mobile device is in the vehicle during the time interval includes:
in response to determining that each of the first, second, third, and fourth changes are outside of the first, second, third, and fourth predetermined range, respectively, determining that the mobile device is not in the vehicle during the time interval.

16. A mobile device for verifying a reliability of sensor data collected by an application installed on the mobile device, comprising:
one or more sensors configured to generate the sensor data in response to the mobile device being in a vehicle;
a processor; and
a memory having a plurality of instructions stored thereon that, when executed by the processor, causes the mobile device to:
collect, at a first time, first sensor data;
collect, at a second time, second sensor data, the second time following the first time by a time interval;
determine whether the mobile device is in the vehicle during the time interval based at least upon the first sensor data and the second sensor data; and
in response to the mobile device not being in the vehicle during the time interval, determining that the reliability of the sensor data is not verified.

17. The mobile device of claim 16, wherein the plurality of instructions, when executed, further cause the mobile device to generate a notification on the mobile device indicating that the application does not work properly in response to determining that the reliability of the sensor data is not verified.

18. The mobile device of claim 16, wherein the plurality of instructions, when executed, further cause the mobile device to generate a notification on the mobile device indicating that an amount of an insurance discount has been updated or adjusted.

19. A mobile device for verifying a reliability of sensor data collected by an application installed on the mobile device, comprising:
- means for generating the sensor data in response to the mobile device being in a vehicle;
- means for collecting, at a first time, first sensor data;
- means for collecting, at a second time, second sensor data, the second time following the first time by a time interval;
- means for determining whether the mobile device is in the vehicle during the time interval based at least upon the first sensor data and the second sensor data; and
- means for determining that the reliability of the sensor data is not verified in response to the mobile device not being in the vehicle during the time interval.

20. The mobile device of claim 19, further comprising:
- means for generating a notification on the mobile device indicating that the application does not work properly in response to determining that the reliability of the sensor data is not verified.

21. The mobile device of claim 19, further comprising:
- means for generating a notification on the mobile device indicating that an amount of an insurance discount has been updated or adjusted.

22. The mobile device of claim 16, wherein the first sensor data is collected in response to a triggering event.

23. The mobile device of claim 19, wherein the first sensor data is collected in response to a triggering event.

* * * * *